US011270283B2

(12) United States Patent
Barkan et al.

(10) Patent No.: US 11,270,283 B2
(45) Date of Patent: Mar. 8, 2022

(54) PRODUCT SCANNING SYSTEMS

(71) Applicant: SYMBOL TECHNOLOGIES, LLC, Lincolnshire, IL (US)

(72) Inventors: Edward Barkan, Miller Place, NY (US); Darran Michael Handshaw, Sound Beach, NY (US); Robert Sanders, St. James, NY (US); Thomas E. Wulff, Brookhaven, NY (US); Mark Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 52 days.

(21) Appl. No.: 16/109,925

(22) Filed: Aug. 23, 2018

(65) Prior Publication Data

US 2019/0073655 A1   Mar. 7, 2019

Related U.S. Application Data

(60) Provisional application No. 62/554,394, filed on Sep. 5, 2017.

(51) Int. Cl.
*G06Q 20/20* (2012.01)
*G06Q 20/32* (2012.01)
(Continued)

(52) U.S. Cl.
CPC ....... *G06Q 20/208* (2013.01); *G06K 7/10366* (2013.01); *G06K 7/10386* (2013.01);
(Continued)

(58) Field of Classification Search
CPC .................................................. G06K 7/10366
See application file for complete search history.

(56) References Cited

U.S. PATENT DOCUMENTS

| 5,773,954 A * | 6/1998 | VanHorn | G06K 7/10722 320/137 |
| 8,037,500 B2 * | 10/2011 | Margis | H04N 7/163 725/74 |

(Continued)

OTHER PUBLICATIONS

International Search Report and Written Opinion for International Application No. PCT/US2018/048774 dated Nov. 21, 2018.

*Primary Examiner* — Peter Ludwig
(74) *Attorney, Agent, or Firm* — Yuri Astvatsaturov

(57) ABSTRACT

At least some embodiments described herein relate to the field of product scanning systems and arrangements used within a retail venue. In an embodiment, the present invention is a system including: a barcode reader repository having docking stations each with a power connector and a lock; barcode readers docked at and locked by the docking stations, each receiving an electrical charge from the respective power connector; a data acquisition assembly configured to capture and decode a symbol associated with an operator profile, and forward the decoded data for further processing; and a server configured to: receive the decoded data; responsively select one of the plurality of barcode readers resulting in a selected barcode reader; transmit, an unlock signal to the lock locking the selected barcode reader to enable removal; and transmit a beacon signal to activate a beacon that is indicative of a physical location of the selected barcode reader.

4 Claims, 16 Drawing Sheets

(51) Int. Cl.
  *G06K 7/10* (2006.01)
  *G06K 19/06* (2006.01)
  *G07G 1/00* (2006.01)
  *G06K 7/14* (2006.01)

(52) U.S. Cl.
  CPC ...... *G06K 7/1413* (2013.01); *G06K 19/06112* (2013.01); *G06Q 20/327* (2013.01); *G07G 1/009* (2013.01); *G07G 1/0081* (2013.01)

(56) References Cited

U.S. PATENT DOCUMENTS

| | | | | |
|---|---|---|---|---|
| 9,324,051 B2* | 4/2016 | D'Ambrosio | | G06Q 10/087 |
| 9,355,510 B2* | 5/2016 | Crigger | | G07C 9/253 |
| 9,483,759 B2* | 11/2016 | Williams | | G06Q 20/32 |
| 9,602,963 B2* | 3/2017 | Chaudhri | | H04B 1/385 |
| 9,659,492 B2* | 5/2017 | Modica | | G08G 1/09 |
| 9,904,777 B2* | 2/2018 | Mark | | H04L 9/32 |
| 10,164,451 B2* | 12/2018 | Jones | | H02J 7/02 |
| 2002/0050526 A1 | 5/2002 | Swartz et al. | | |
| 2005/0077997 A1* | 4/2005 | Landram | | H04L 67/34 340/5.54 |
| 2009/0158423 A1* | 6/2009 | Orlassino | | G06F 21/32 726/19 |
| 2010/0012715 A1* | 1/2010 | Williams | | G06Q 20/202 235/375 |
| 2013/0257590 A1* | 10/2013 | Kuenzi | | G07C 9/00174 340/5.65 |
| 2015/0088698 A1* | 3/2015 | Ackerman | | G06Q 30/0641 705/26.82 |
| 2015/0215770 A1 | 7/2015 | Chan et al. | | |
| 2015/0363749 A1* | 12/2015 | Buscher | | G06Q 20/18 705/305 |
| 2016/0039442 A1* | 2/2016 | Tilburger | | G07F 7/0672 280/33.992 |
| 2016/0261995 A1* | 9/2016 | Zhu | | G08B 21/182 |
| 2016/0342817 A1* | 11/2016 | Deal | | G06F 21/31 |
| 2018/0197163 A1* | 7/2018 | Kelly | | G07F 17/0071 |
| 2018/0315011 A1* | 11/2018 | Clarke | | G06Q 20/208 |

* cited by examiner

PRODUCT SCANNING SYSTEMS

CROSS-REFERENCE TO RELATED APPLICATIONS

This application claims the benefit of U.S. Provisional Patent Application No. 62/554,394 filed on Sep. 5, 2017, which is incorporated herein by reference in its entirety.

BACKGROUND

Traditional retail stores often have a configuration where, upon selecting a shopping cart, customers browse store aisles, pick a desired variety of products, and proceed to a checkout area to pay for all the selected items. These configurations can have a number of drawbacks. For instance, checkout lanes take up valuable real estate that could otherwise be used for, for example, product shelving. Moreover, during times of high traffic, lines can form at the checkout lanes as the checkout process normally requires a customer to remove all items from the carts, scan (by himself or by a cashier) each of the products using a barcode scanner, bag all scanned items, and then pay for the final total. This process can be frustrating to consumers as it can cause unnecessary delays in the time that is spent in the store, and tasks like scanning and/or bagging performed at self-checkout lanes can, at times, be difficult to execute.

While some stores have implemented configurations where store personnel can checkout a customer in virtually any spot, these configurations in essence miniaturize the point of sale (POS) equipment, allowing the so-called checkout lane to be at any location in the store. As a result, these systems simply shift the physical location of the checkout process without addressing the concerns outlined earlier.

Accordingly, there is a need for improved systems and methods associated with retail shopping.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
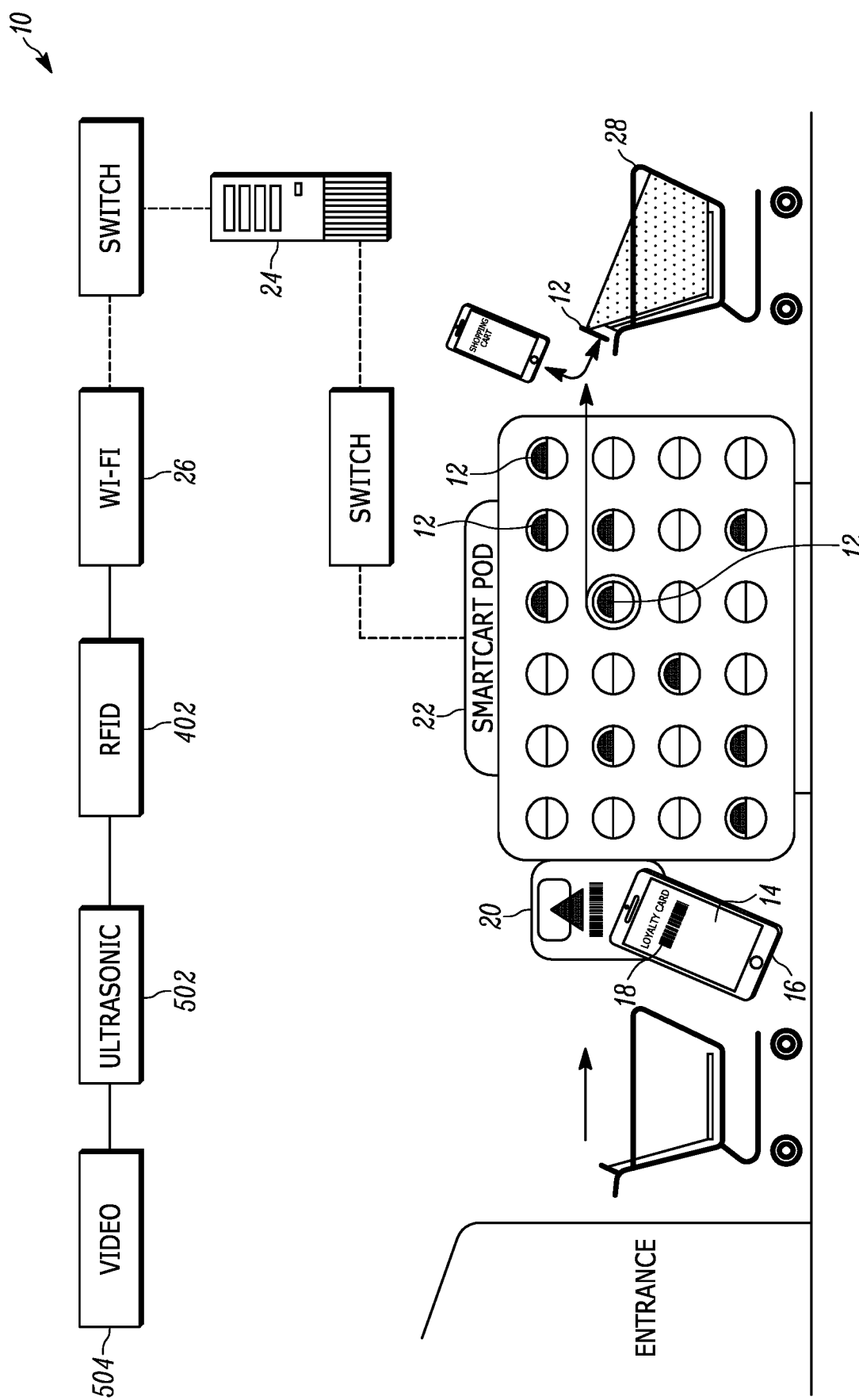
FIG. 1 illustrates a block diagram of an exemplary transactioning system in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As shown in FIG. 1, a data capture system (also referred to as a product scanning system) 10 in accordance with an embodiment of the present disclosure includes a cordless (e.g., battery powered) barcode scanner 12 that is made available to the consumer (not shown). Upon entering a retail venue (e.g., a store), the consumer opens an application (app) 14 implementing a graphical user interface (GUI) on a smartphone 16 or similar personal mobile device, having one or more processors, that is associated with a customer. The app 14 causes a barcode (e.g., 1D barcode, 2D barcode, or any other symbol that encodes customer data) 18 to be displayed on the screen, which the customer/consumer presents to a barcode scanner (also referred to as a data capture module or a data acquisition assembly) 20. The barcode scanner 20 is communicatively connected to a scanner dispensing pod (also referred to as a data capture device repository or a barcode reader repository) 22 which houses one or more scanners (also referred to as readers or data capture devices) 12. In some implementations, the scanners 12 can be locked in the dispensing pod 12 until an unlock signal is activated. Upon scanning the barcode 18, the system 10 directs the consumer to a particular barcode scanner (also referred to as an associated scanner/reader/data capture devices) 12 by, for example, activating a visual beacon associated with that specific scanner. In implementations where the scanners are locked in the dispensing pod 22, the system also activates an unlock mechanism, allowing the consumer to collect the specific scanner 12.

A particular advantage of the 'locked scanner' implementation is that the system 10 may be configured to keep track of a particular charge level on each of the scanners 12. Taking this into consideration, the system 10 may, for example, unlock a scanner with a full, or a highest, charge rather than allowing the consumer to select any scanner at will as the consumer may inadvertently select a scanner that has a relatively low charge. Additionally, such a configuration may help from a security point of view as any removal of a scanner can automatically be associated with a personal profile whose phone and app are used for scanning at the barcode scanner 20.

The app 14 can be configured to activate the phone's wireless (e.g., Wi-Fi and Bluetooth) components for connection to the store's network. As will be described in this disclosure, the interaction between the consumer's phone 16, scanner 12, and the store's server 24 may provide particular benefits. (As used herein, it will be understood that a reference to a controller may include server 24 and any other microprocessors and/or microcontrollers that are used to control hardware in a particular way). Upon activation, the app 14 may direct the phone 16 to connect to the server 24 via, for example, a wireless infrastructure 26 (e.g., one or more wireless access points) installed throughout the store. It should be understood that server 24 may, but does not need to, be on-site at the store's location. Additionally, the may include one or more physical and/or logical processors which may be functionally assembled in one computer system or may be distributed over multiple computer systems. The server may also include one or more memories to storing various data. In either instance, any combination of customary communication means like, for example, wired and/or wireless, public and/or private networks, copper and/or fiber, direct or indirect, may be used to provide communication between the server 24 and any components disclosed here.

The system 10 may be configured such that the connection between the phone 16 and the wireless infrastructure 26 may be automatic upon the launching of the app (assuming that the phone 16 is within range of the wireless signal). The system may also be configured such that the connection may become fully activated upon the scanning of the barcode 18 by the barcode scanner 20. In this implementation, the barcode 18 may include the phone's 18 credentials (e.g., media access control address (MAC address)) which, upon scanning the barcode 18, can be forwarded to the server 24. Having this information, the server 24 can direct its wireless infrastructure to establish a connect with the specific phone. This may help prevent unauthorized access to the store's network, as only phones with the app may be granted wireless connectivity access. The system may further be configured such that the app 14 requests the consumer to scan a barcode attached to or near, for example, the barcode scanner 20 where the barcode can transmit the store's wireless infrastructure credentials to the phone 16, allowing the phone 16 to connect to the server 24. The barcode used for conveying store's wireless credentials may be displayed on an electronic screen and changed periodically so as to increase security.

Further to connecting to the server 24, the phone 16 can be paired with the particularly selected scanner 12 via, for example, the phone's and scanner's Bluetooth modules. In some implementations, this can be done by having the server 24 place a particular scanner 12 into a Bluetooth pairing mode and transmit the particular scanner's pairing credentials (e.g., MAC address, passkey, etc.) to the phone 16 via an established wireless connection between the phone 16 and the server 24. On the other end, the phone 16 can enter into a Bluetooth pairing mode and pair with the particular scanner 12 using the credentials received from the server 24. In some implementations, the phone 16 and the particular scanner 12 may be paired via Near-Field Communication (NFC). NFC is a set of communication protocols that enable two electronic devices to establish communication by bringing them within close proximity to each other. Specific instructions regarding NFC pairing may appear on the phone's screen at any predetermined time. In some cases, it may be advantageous to direct the consumer to pair with the scanner only after the scanner has been collected from the dispensing pod 22. This can be done by having the system 10 sense a scanner-collection signal indicating that a particular scanner has been collected, and having the server 24 send a signal to the app 14 via the wireless network 26 causing the app 14 to display the NFC pairing instructions.

To reduce abuse or theft of scanner 12, a scanner that hasn't been paired within a reasonable timeframe (such as a minute) of being removed from the cradle can be programmed to emit a loud sound to alert employees that: a customer needs assistance pairing, a scanner is being stolen, or the scanner has not been paired correctly for more nefarious reasons. Additionally, to reduce the chances of damage to normally fragile components, the scanner 12 can be configured to be screen-less such that all information that needs to be conveyed to the consumer is displayed on the consumer's phone 16.

Figure 2:
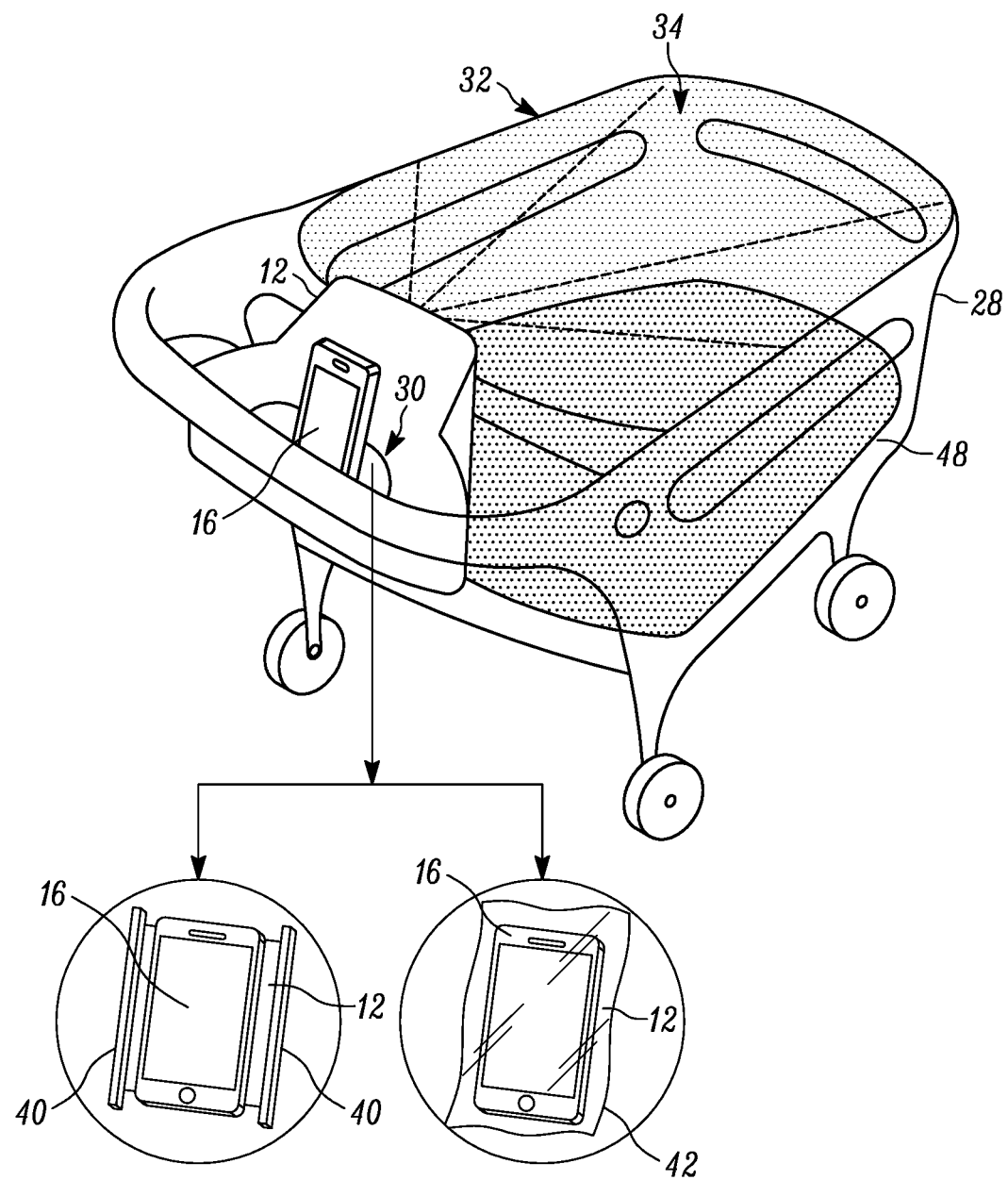
FIG. 2 illustrates a shopping cart together with a scanner and a phone in accordance with an example of the present disclosure.

Upon a successful connection between all necessary device and a collection of a particular scanner 12, the consumer can place the phone 16 on (as shown in FIG. 2) or near the collected scanner 12. To accommodate the scanner 12 and/or phone 16, the shopping cart 28 can include a holder 30 sized to receive one or both of the devices. In some implementation, the holder 30 could be a basket adopted to frictionally receive the scanner 12. Preferably, the basket is positioned such that when the scanner 12 is positioned therein, the scanner's scan (optical or radio) field of view 32 extends over the item-receiving area 34 of the cart 28. In some implementations, the holder 30 is non-electronic. Eliminating electronic componentry can provide an advantage in that the cart 28 may be left outside in inclement weather without the worry of damaging electronics. Moreover, if a cart 28 is misplaced, stolen, or damaged, such an occurrence does not particularly impact system 10 in that any other cart 28 can be used.

In some implementations, the holder 30 may include a locking feature for the scanner 12 and/or the phone 16. For example, as shown in the zoomed view of FIG. 2, the locking feature 30 may include one or more compressive members 40 designed to hold the scanner 12 and/or phone 16 in place via compressive force, a transparent cover 42 designed to lockably cover the scanner 12 and/or phone 16, and/or other mechanisms configured to deter and/or prevent intentional and/or unintentional displacement of the scanner 12 and/or phone 16. The inclusion of a locking feature can provide added security for instances when a consumer leaves the cart 28 with the phone 16 to explore shelved products.

Once the phone 16 is connected with the store's server 24, the consumer is recognized through the app. This can be done by having the consumer enroll into a specific shopping program, for example, at the time of installing the app 14 or enrolling through the store's website using any device that has access thereto. During enrollment, the consumer is asked to provide various information including information related to a payment method (e.g., credit card number, debit card, bank account, etc.) which will be used to pay for items the consumer scans while in the store. Furthermore, access to the app may be password, fingerprint scan, retinal scan, etc. protected to help prevent unauthorized access.

Additionally, the server 24 may communicate to the app 14 display data that is formatted or customized as desired by the store and/or consumer. It should be noted that at least some embodiments of the current system are envisioned to be applicable to any number of environments, including a single store, a chain of stores, and multiple chains of stores. To that end, the app 14 is customizable by store owner to provide, what it believes to be, an enjoyable shopping experience. This may include, for example, giving the consumer an option to request promotional data to be pushed to the app based on where the consumer is. It may also include a common interface/features across multiple stores belonging to the same chain. This can help the consumer become accustomed to the shopping experience, encouraging repeat business.

Figure 3:
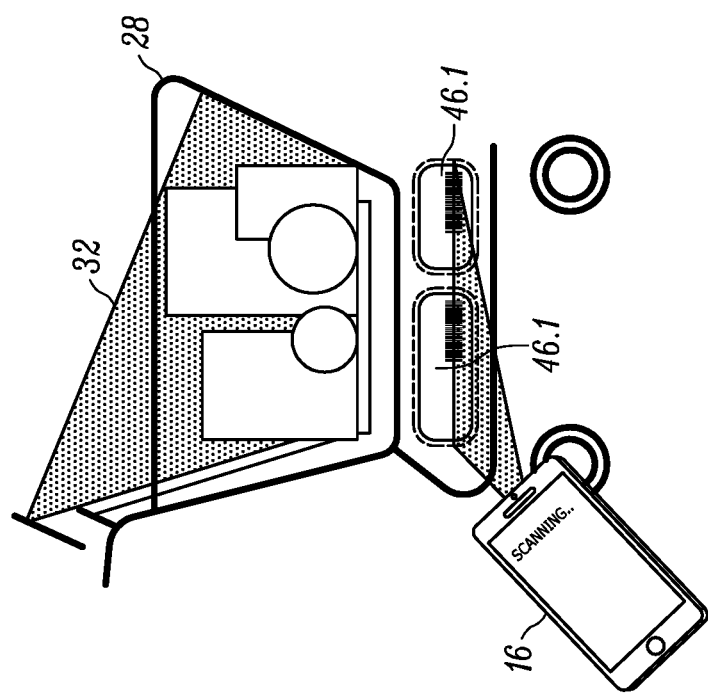
FIGS. 3-4 illustrate block diagrams of a scanner and a phone in exemplary use within the system of FIG. 1.
Figure 3:
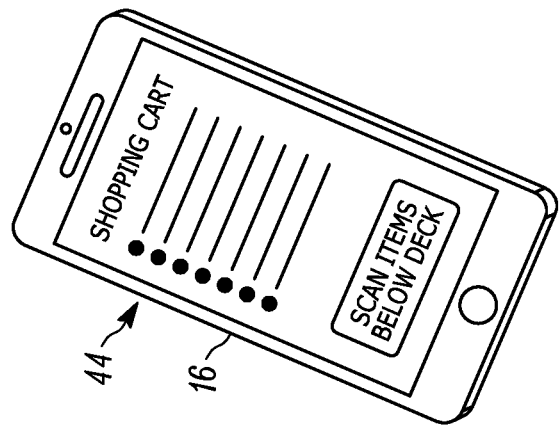
Figure 3:
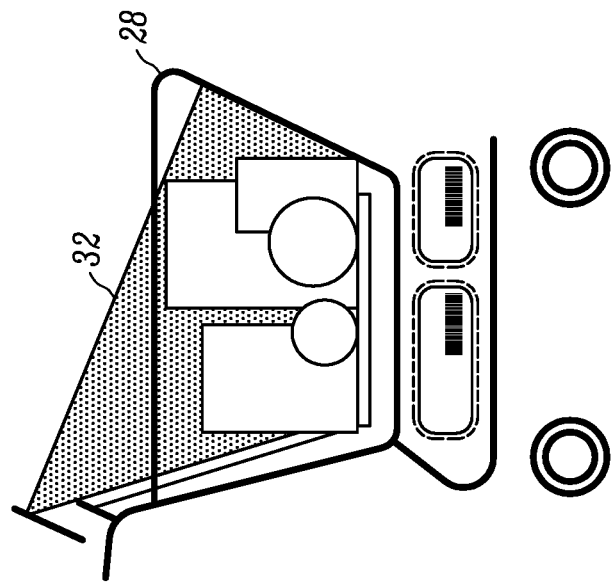
Figure 4:
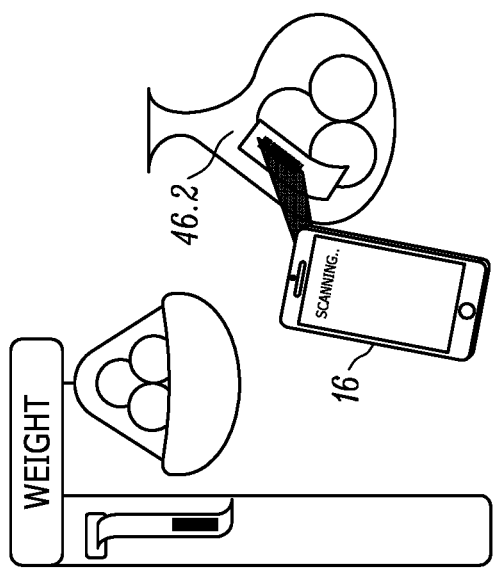
Figure 4:
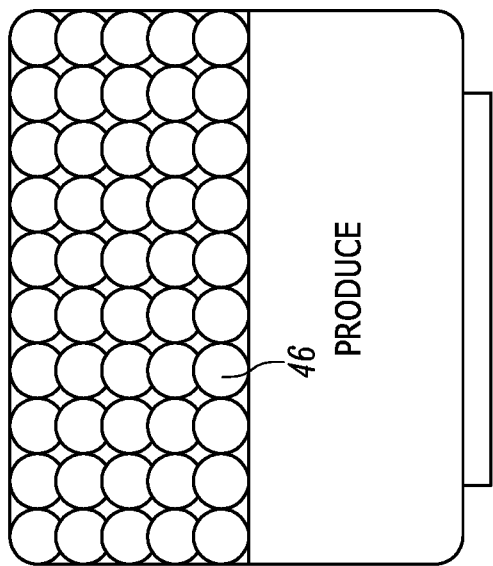
Figure 4:
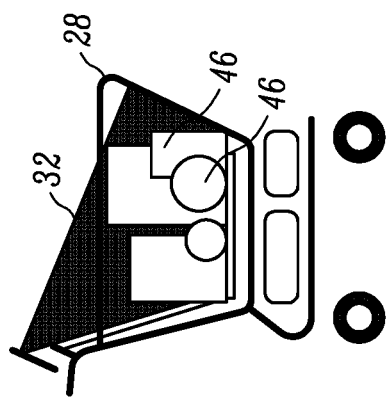

The system 10 can provide a variety of services to the consumer. For example, referring to FIGS. 3-4, a shopping list 44 can be displayed, the list having been previously manually input to the phone 16, or transmitted to the phone 16 from a home computer or from another device. Similarly, the shopping list may be transmitted to the server 24 from another device and, upon connecting to the phone 16, transferred to and displayed on the phone's screen. As the consumer walks around the store, he scans each item 46 on the list and puts it in the shopping cart 28, causing those items to be removed from the shopping list. Additionally, the cart 28 may be equipped with a scale (see FIG. 2) for calculating the weight of items priced depending on their weight. The phone 16 display can also show a running total of the costs of items scanned, and can show in advance what the total will be if all items on the list are purchased. Sales tax can be included in the displayed total. Prices of each item can be accessed via the store wireless (e.g., Wi-Fi) network, or in advance of arriving at the store via the Internet. The phone 16 can also display a map showing an optimized route through the store, allowing all items on the shopping list 44 to be gathered in short time. The map can also be downloaded from the store system 24 via the store's wireless network or in advance over the Internet.

If a consumer decides not to buy an item already scanned, a "subtract" button on the phone display can be touched, and the item scanned again. This signals the phone to subtract the cost of an item from the running total that is scanned immediately after the subtract button is touched.

It is envisioned that scanners (like scanner 12) may take any number of form factors and may implement the scan function in any number of ways that ultimately acquires data associated with some identifying target such as, for example, a barcode or a radio frequency (RF) identification (RFID) tag.

For instance, FIG. 1 is illustrated as using a stationary barcode scanner 12 adapted to be secured to the cart 28. The scanner 12 includes an optical image scanner having an image capture arrangement with a solid-state imager that can be a CCD or a CMOS imaging device. The solid-state imager generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns, or in any other arrangement. The photosensitive elements of a two-dimensional arrangement form a substantially flat surface. The solid-state imager is operative to detect light captured by an imaging lens assembly along an optical path or axis through the scanner's window. Generally, the solid-state imager and the imaging lens assembly are designed to operate together for capturing light scattered, reflected, or emitted from a barcode as pixel data over a two-dimensional field of view (FOV) 32. Additionally, the scanner 12 may include an image recognition engine, an on-board processor to reduce feedback time that could be required if the scanner is required to communicate data to the server for computation, storage having an image library to be used by the image recognition engine, and an infrared sensor for scanner triggering.

Figure 5:
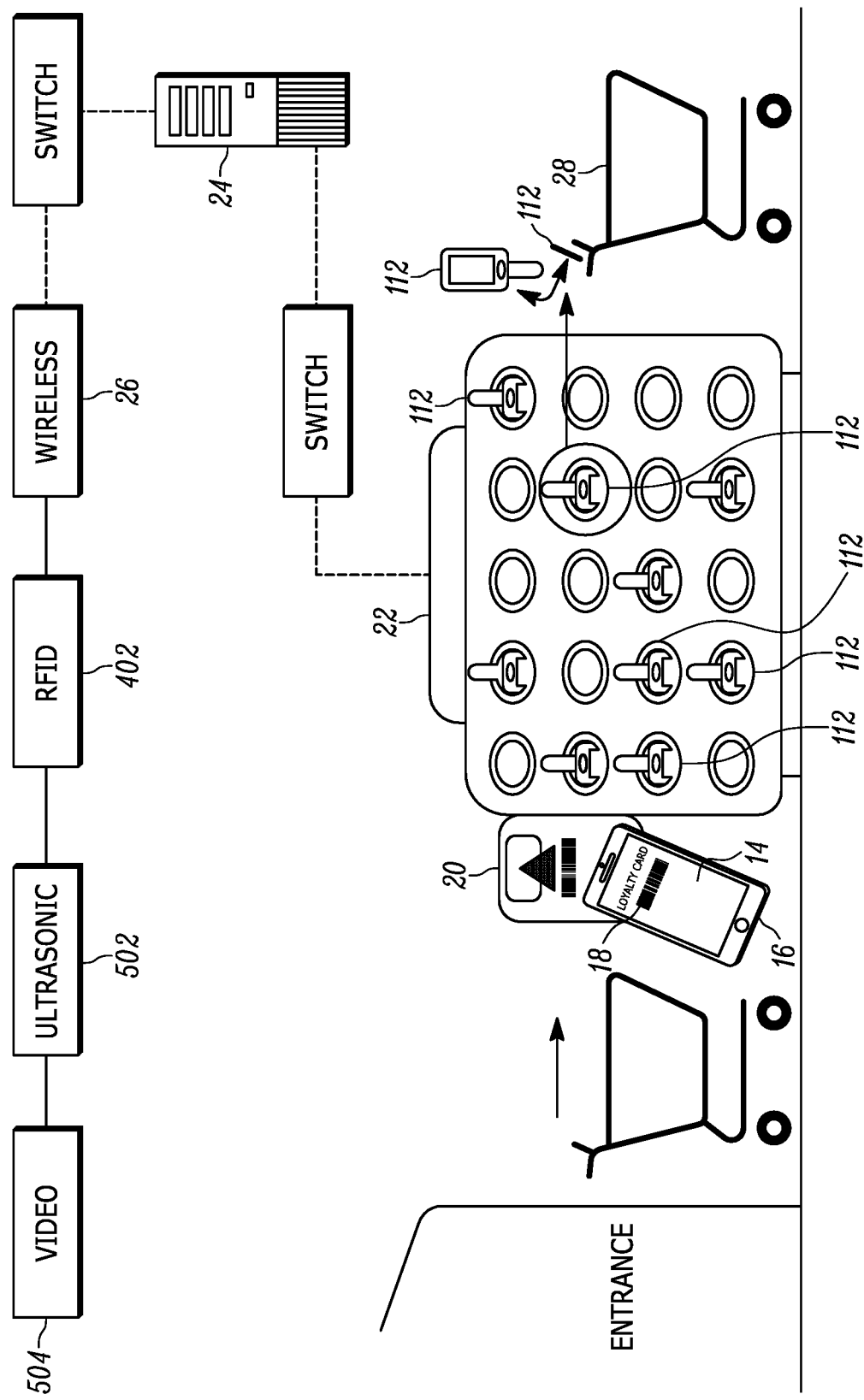
FIG. 5 illustrates a block diagram of an exemplary transactioning system in accordance with the present disclosure.
Figure 6:
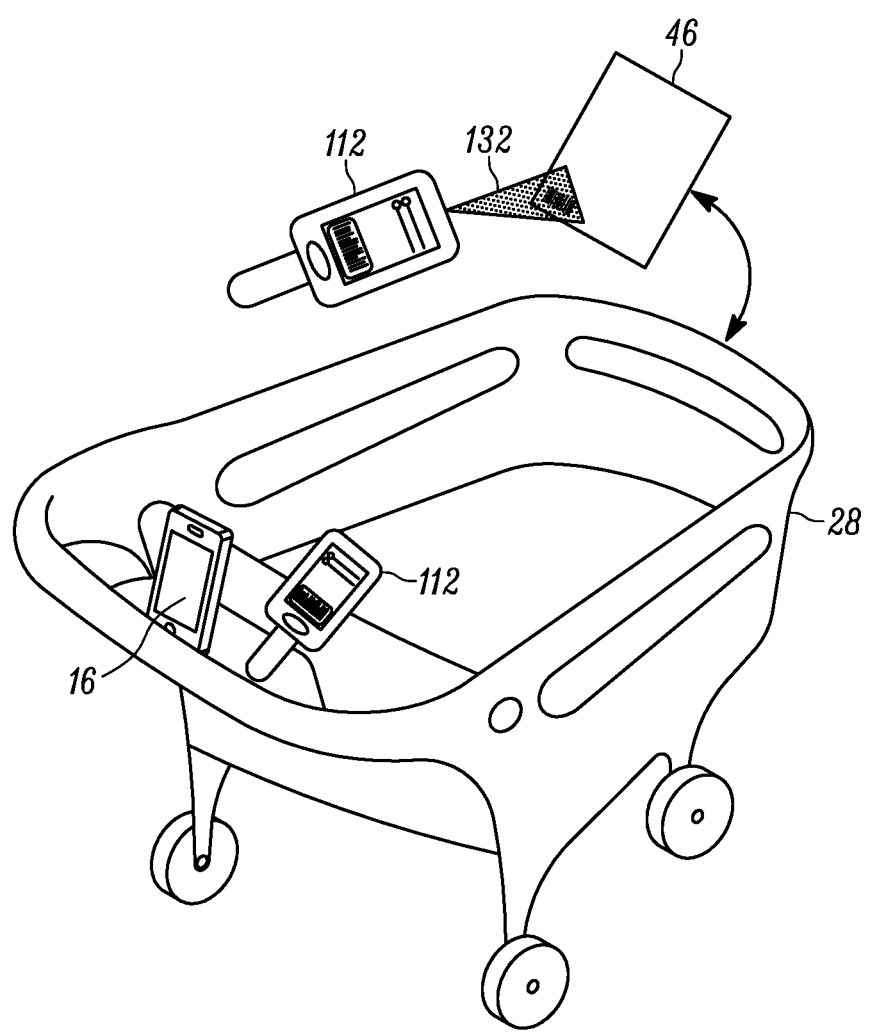
FIGS. 6-7 illustrate block diagrams of a scanner and a phone in exemplary use within the system of FIG. 5.
Figure 7:
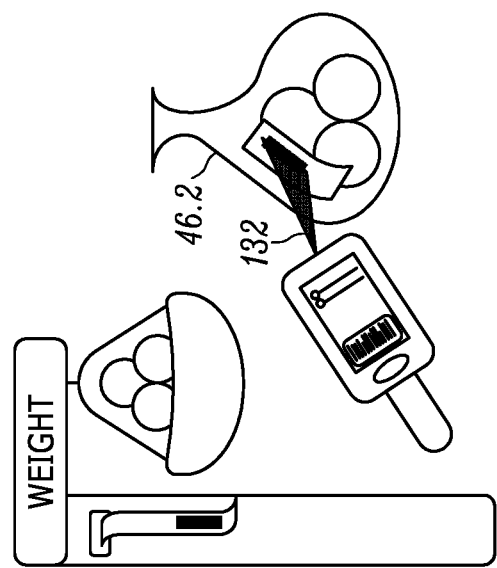
Figure 7:
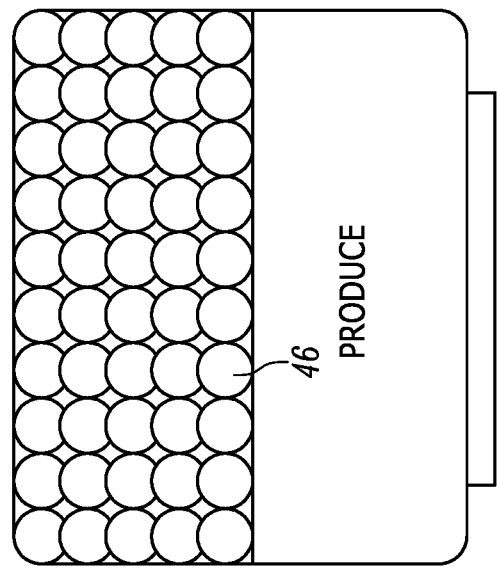
Figure 7:
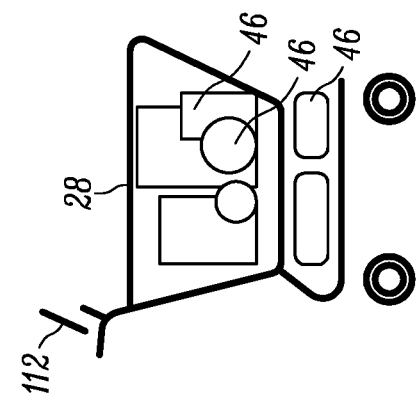
Figure 8:
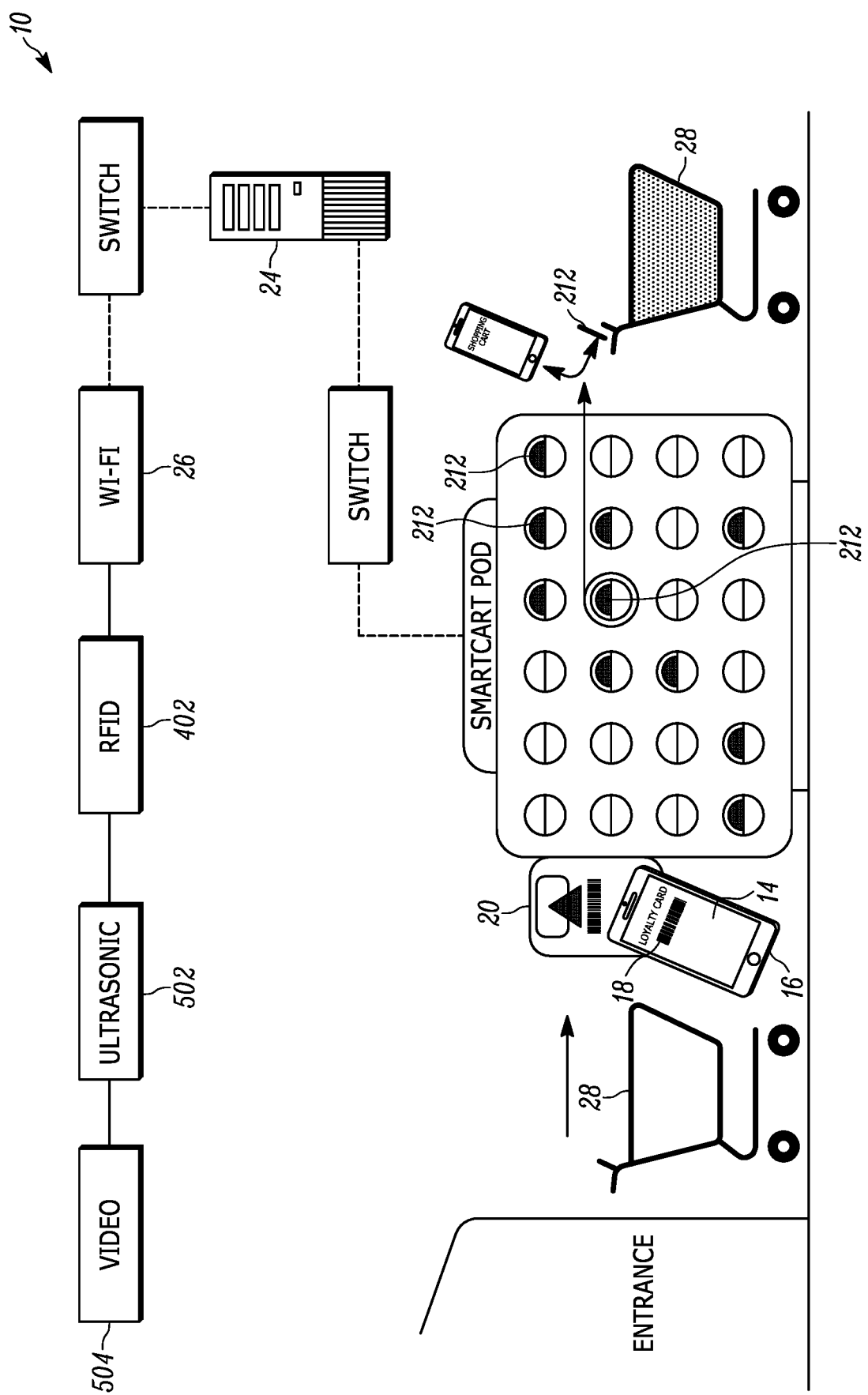
FIG. 8 illustrates a block diagram of an exemplary transactioning system in accordance with the present disclosure.

However, the same principles can be applied to a handheld scanner 112 illustrated in FIGS. 5-7. It will be appreciated that scanners 12 and 112 can be used in same/similar settings and same/similar manner as disclosed above. Still, there are some differences between scanner 12 and scanner 112. For instance, scanner 112 is configured to be a handheld scanner, operable in the hand of a user. As such, its FOV may be different from that of the scanner 12. Moreover, it may be configured to scan upon a pull of a trigger mechanism, potentially conserving energy over a configuration where the optical scanning components may need to actively monitor for products without a direct user input (e.g., a trigger pull). Though scanner 12 may include such a user input, in at least some embodiments its imager is configured to actively monitor for products without a trigger (also referred to as a presentation mode). Such a presentation mode may also be available on the handheld scanner 112 where the scanner 112 can be configured to enter presentation mode upon being placed into the holder 30 of the cart 28 and it can further be configured to exit the presentation mode and enter a handheld mode upon being picked from the cart 28.

In another instance, scanner 112 may be easier to move around as it is configured to be held in a consumer's hand. This may allow the consumer to scan items 46 that are not within the FOV 32 of the scanner 12. This may be addressed by configuring the system 10 such that the phone 16 is used as an extension of the scanner 12, allowing the optical imaging componentry of the smartphone to act as a barcode scanner and transmitting the captured barcode data to the scanner 12. This can be seen in FIG. 3 where the phone 16 is used to scan items 46.1 positioned on the bottom of the cart 28 and also in FIG. 4 where the phone 16 is used to scan the barcode of an item 46.2 not in the cart 28.

Figure 9:
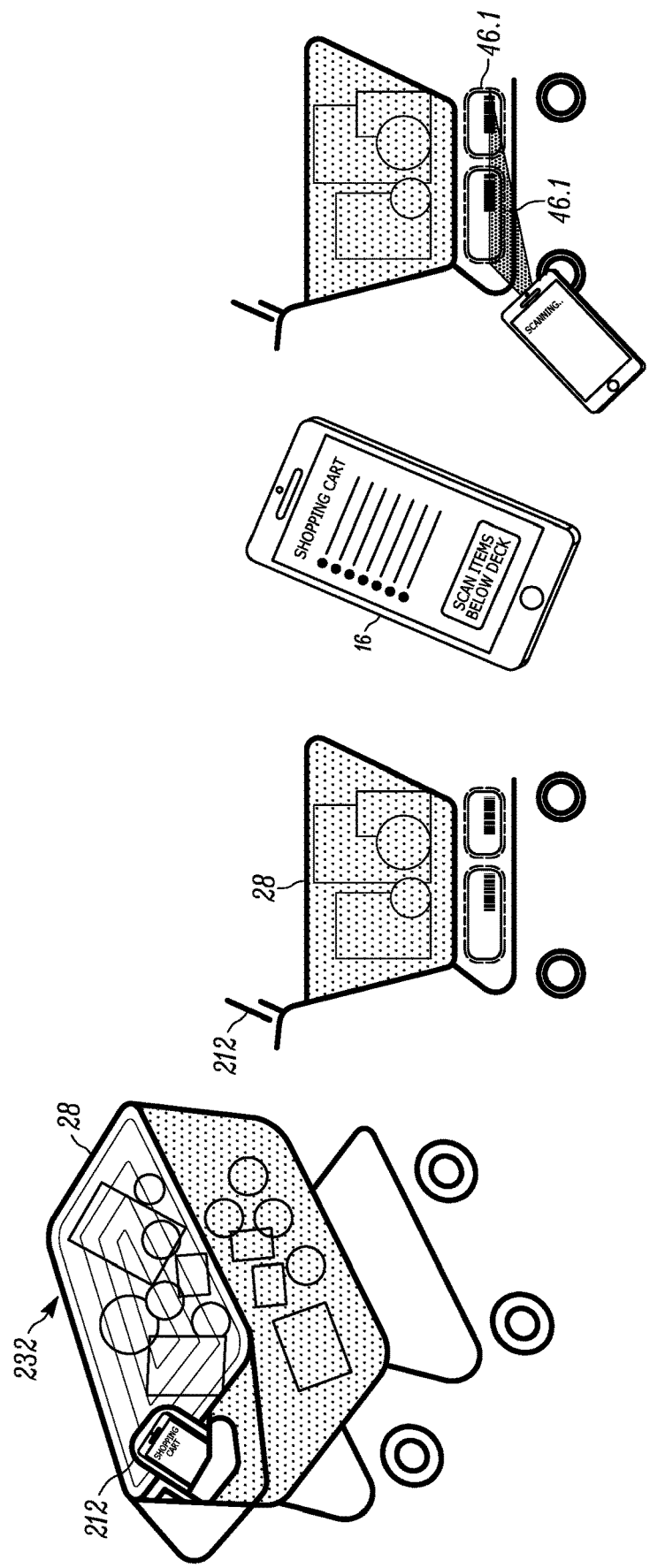
FIGS. 9-10 illustrate block diagrams of a scanner and a phone in exemplary use within the system of FIG. 8.
Figure 10:
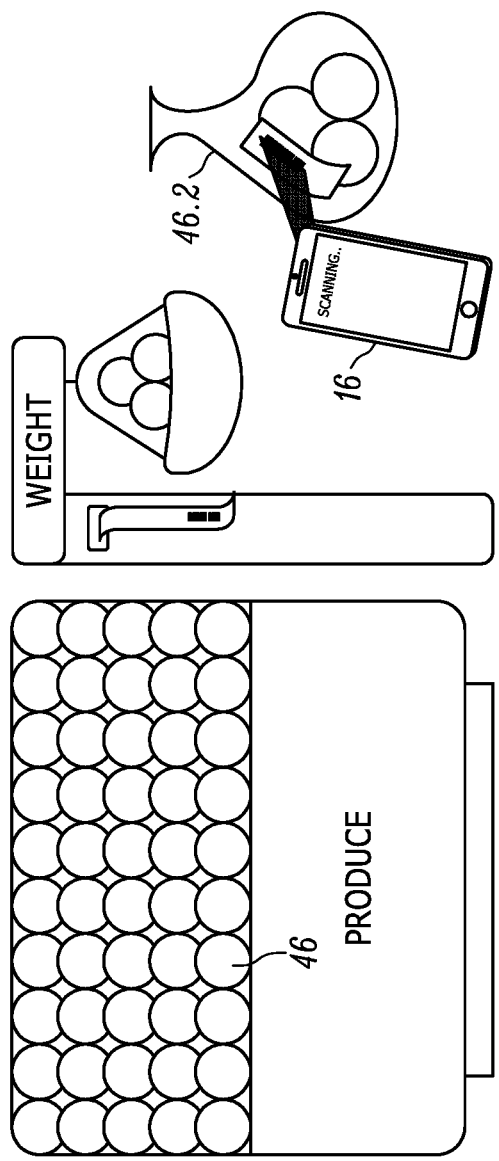
Figure 10:
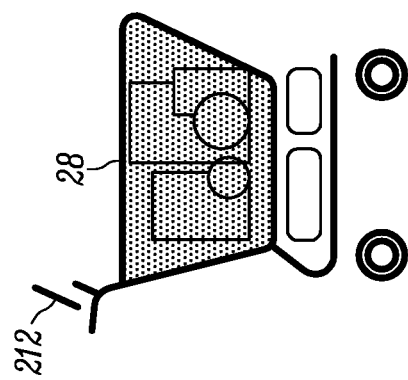
Figure 11:
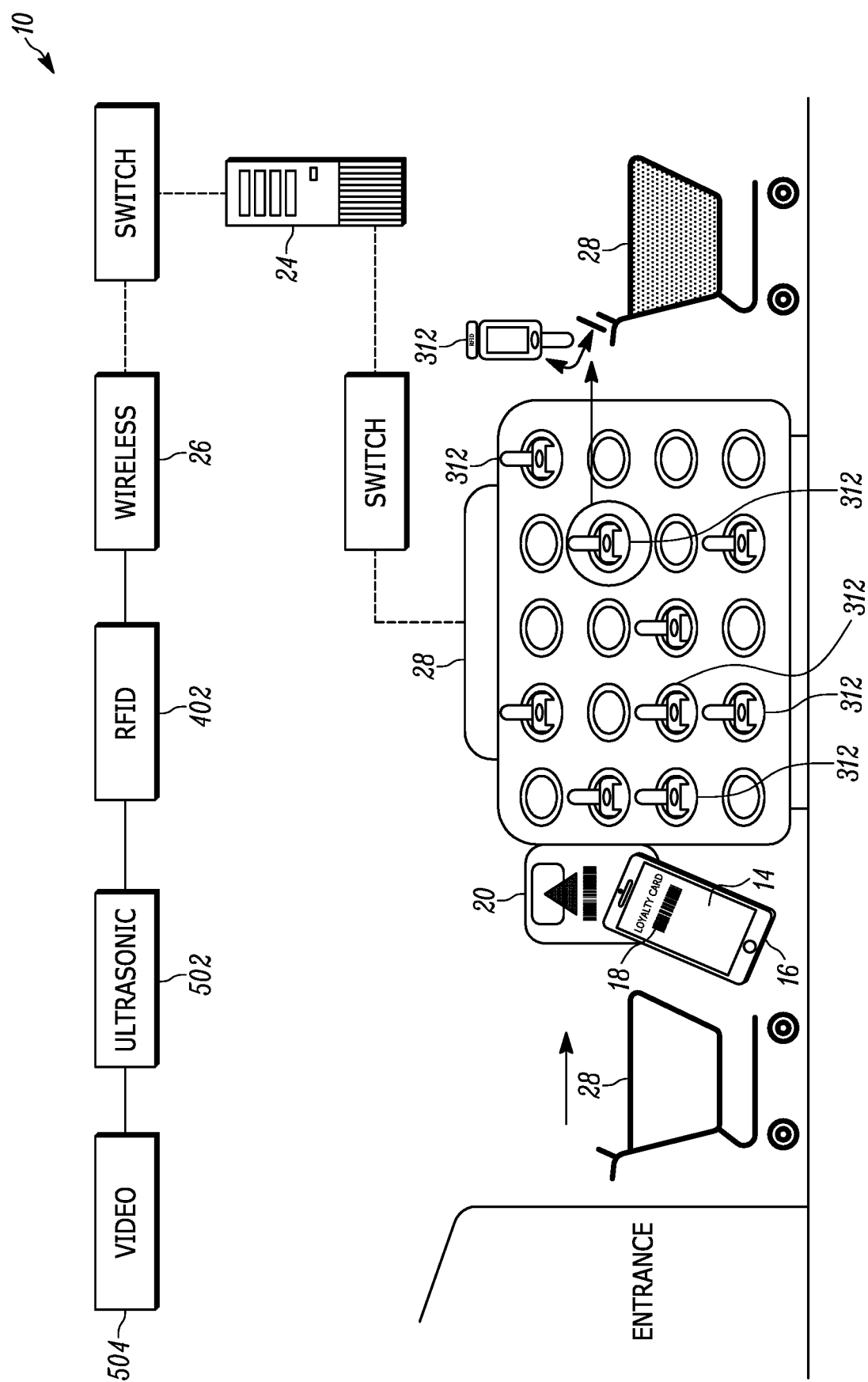
FIG. 11 illustrates a block diagram of an exemplary transactioning system in accordance with the present disclosure.
Figure 12:
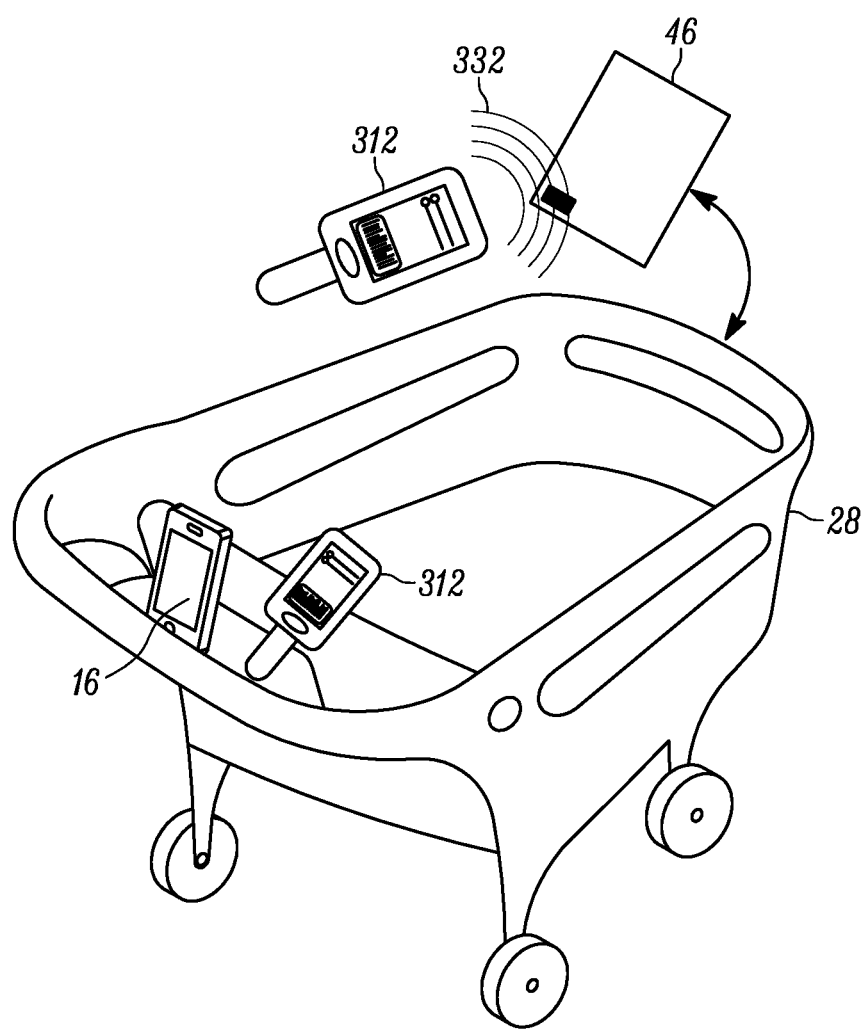
FIGS. 12-13 illustrate block diagrams of a scanner and a phone in exemplary use within the system of FIG. 11.
Figure 13:
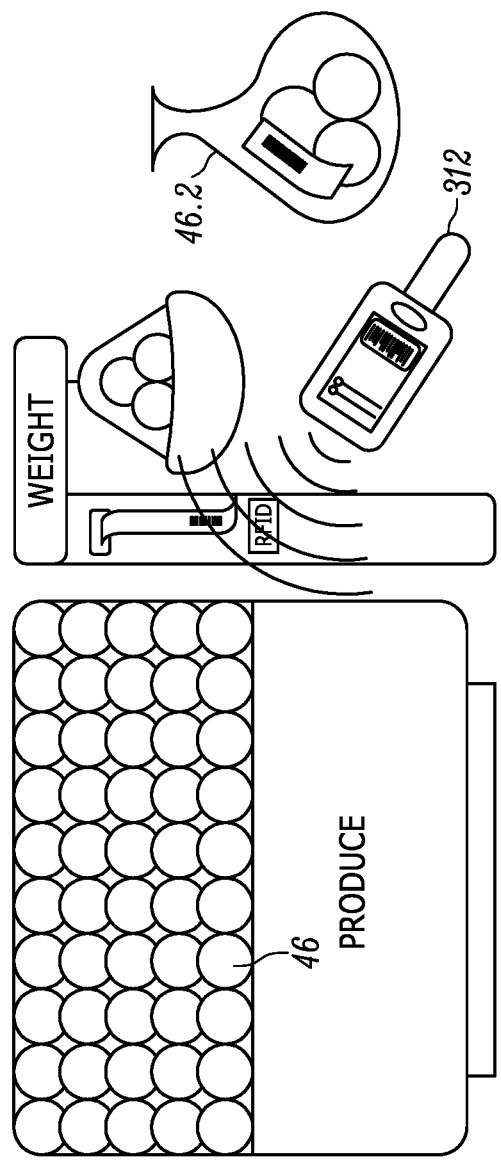
Figure 13:
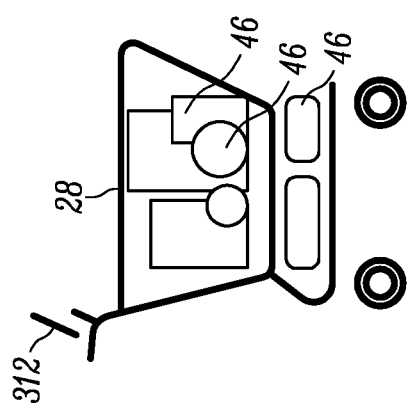

Though scanners 12 and 112 have been described as using imaging components to capture image data related to indicia such as, for example, barcodes, other capture mechanisms are within the scope of the present disclosure. For examples, embodiments shown in FIGS. 8-10 and FIGS. 11-13, respectively, disclose scanners 212 and 312. These scanners are similar to scanners 12 and 112, with the primary difference being in that scanners 212 and 312 are shown as employing RFID data capture. This can be done by replacing the imaging and/or supplementing the imaging components with RFID reader components. Accordingly, with an RFID configuration, as better seen in FIGS. 9 & 12, the optical FOV 32 of scanner 12 is replaced with an RF beam 232, 332.

More particularly, an RFID reader includes an RFID tag reader module that can have a controller, a memory, and an RF transceiver, which are operatively connected to one or more of RFID antenna elements, which are energized by the RFID module to radiate an RF beam 232, 332 over an antenna field pattern. The RF transceiver is operated, under the control of the controller, to transmit RF beam 232, 332 to RFID tags within its range, and to receive RF response signals from the tags 300 thereby interrogating and processing the payloads of the tags that are in its read zone. The payload or captured target data identifies the tags and their associated products.

It will be appreciated that both capture methods are not mutually exclusive and instead may be combined. In other words, it is within the scope of the present disclosure that a scanner may employ both imaging and RFID data capture approaches in a single embodiment. It will also be appreciated that while the discussion above/below may reference only one scanner (e.g., 12), unless expressly stated otherwise, the discussion shall apply to any scanner that falls within the scope of the present disclosure.

In some instances, the consumer will decide not to buy something already in the shopping cart 28 when, for example, coming across another item that looks preferable, or if the running total cost is getting too high for his budget. On these occasions, consumers tend to place items back on shelves wherever they happen to be rather than returning the item to its proper place in the store. When the system 10 detects that an item is being un-scanned, the location of the un-scanning event can be detected by, for example, locating an RFID tag that is installed inside each scanner 12. The system may also use another locationing technique, like ultrasonic locationing, to determine the approximate location of the scanner 12 that is involved in the un-scanning operation. Exemplary systems used for RFID and ultrasonic locationing will be described in further detail later in this document. The system 10 also records what item has been un-scanned, so it has sufficient information to determine that an un-scanned item is now located incorrectly. In response to such a determination, a store employee can be dispatched to that location to return the item to its proper place.

When all items 46 the consumer wants to purchase have been scanned and placed in the shopping cart 28, the scanner 12 is replaced into the charger/dispenser 28, signaling the system 10 that the shopping transaction is done, at which time the consumer's credit card or other payment method is charged for the scanned items 46 (also referred to as closing a session for the scanner items). A receipt can be emailed to the consumer, and he/she may exit the store with the cart 28 filled with the scanned items 46.

The system 10 may include security measures to help assure consumers don't leave the store with un-scanned items. For example, a store-wide RFID tracking system (coupled to system 10) can track the consumer through the store (facilitated by the phone which is logged into the App or by the RFID tag in the scanner, or an RFID tag on the cart). Such an RFID tracking system can check whether a scanned item is scanned in an area where that item is known to be displayed in the store. This may help avoid the possibility of consumers scanning a low-priced item while placing a high-priced item in the cart. An RFID tracking system may also detect if expensive items, which may be individually marked with RFID tags, have been placed in the cart without the barcode being scanned, or if the consumer tries to leave the store without placing the scanner back in the charger/dispenser, in an attempt to avoid being charged. In some implementations, the automatic sliding exit door, of the kind common in department stores and supermarkets, remain closed if a shopper attempts to leave with the scanner or with items in the cart that haven't been scanned. The system 10 may also initiate an alert directed to the store's security personnel.

The scanner 12 can include a battery with a high-enough capacity to help keep the phone 16 operational while the scanner 12 is in operation by the consumer. For example, when the scanner is in the holder 30 in the cart 28, an electrical connection can be made to its battery, which can be wired to a connector (e.g., USB) on the rack, to which the phone 16 can be connected. In some configurations, the holder 30 may have multiple connectors adapted to accept phones with different charging systems. Providing a phone power source may allow the consumer an enhanced shopping experience in that his phone 16 will likely not run out of power. Additionally, in instances where consumers use the scanner 12 as a kind of charging station, the consumer could spend additional time in the store, leading to additional sales.

Figure 14:
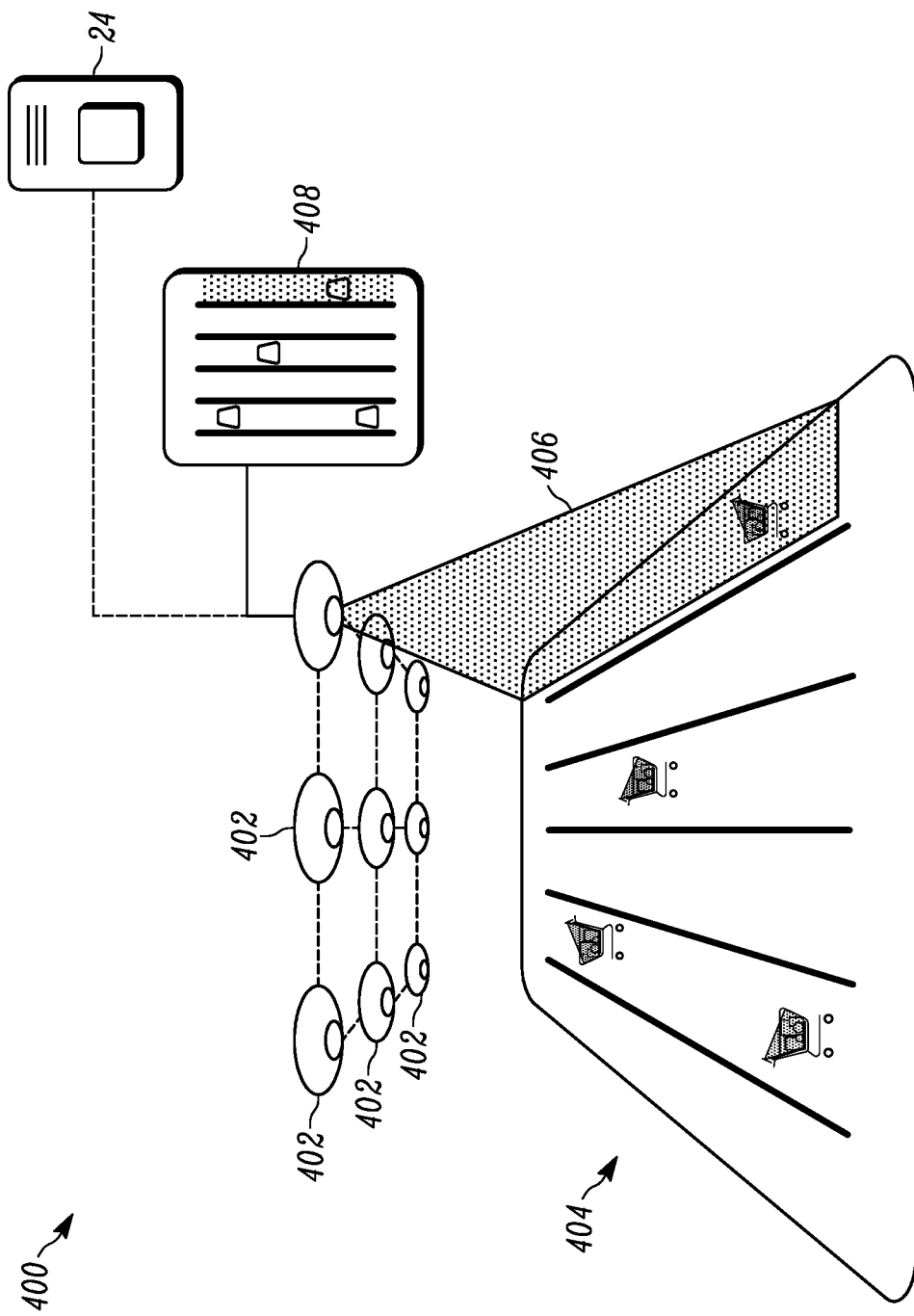
FIGS. 14-15 are block diagrams of exemplary locationing system used as part of the transactioning systems in accordance with various embodiments of the present disclosure.

As mentioned before, the current system can include/work in conjunction with a locationing system. Referring to FIG. 14, in some embodiments, the locationing system 400 is an RFID-based locationing system which includes a networked plurality of RFID readers 402 disposed throughout a venue 404 and communicatively connected to server 24. Readers 402 can be positioned in a grid-like pattern and can be installed in or near the ceiling of the venue. Each RFID reader 402 may radiate an RF beam 406 over a predefined area (also referred to as a read zone), capturing RFID tag information therefrom. Having system 400 in place can help provide an image library 408 detailing the position of each scanner 12, phone 16, and/or cart 28 within the venue or within the area covered by the read zones of the system 400.

In some configurations, system 400 may replace and/or supplement RFID readers 402 with ultrasonic transmitters 502 (see FIG. 1) operable to emit ultrasonic signals for locating electronic devices capable of detecting the emitted ultrasonic signals.

More particularly, in this case the locationing system includes an ultrasonic locationing module having control and processing electronics operatively connected to a plurality of ultrasonic transmitters 502, such as voice coil or piezoelectric speakers, for transmitting ultrasonic energy to the microphone on the electronic device (e.g., scanner 12 and/or phone 16). The receipt of the ultrasonic energy at the microphone locates the electronic device. Each ultrasonic speaker can periodically transmit ultrasonic ranging signals, preferably in short bursts or ultrasonic pulses, which are received by the microphone on the electronic device. The electronic device determines when the ultrasonic ranging signals are received by the microphone. The locationing module, under the control of the server 24, preferably directs all the speakers to emit the ultrasonic ranging signals such that the microphone on the electronic device will receive minimized/reduced overlapping ranging signals from the different speakers. The flight time difference between the transmit time that each ranging signal is transmitted by the transmitters and the receive time that each ranging signal is received by the microphone, together with the known speed of each ranging signal, as well as the known and fixed locations and positions of each speaker on each ultrasonic transmitter, may all be used to determine the position of the microphone of the electronic device, using a suitable locationing technique, such as triangulation, trilateration, multilateration, etc.

Additionally, system 400 may include at least one video camera 504 (see FIG. 1). The video camera 504 may be installed in any suitable location within the venue 404 and can be used to locate and/or track movement of carts, consumers, products, and/or other objects throughout the store. Video camera 504 can include a video module having camera control and processing electronics that is connected to a camera's imaging elements for capturing images/video of targets over an imaging field of view. The camera 504 can be a high-bandwidth, moving picture expert group (MPEG) compression camera. The capture of the images/video by the camera 504 can be processed by the server 24 to locate the desired target. Furthermore, the use of camera(s) 504 may be combined with visual beacons on scanners 12 that can help locate the scanners 12 (and thereby carts 28 and consumers associated with the carts). For instance, scanner 12 may include a visual beacon that can emit a visual signal detectable by the camera 504 and server 24. The visual signal may be designed to visually stand out from its surrounding environment (e.g., bright flash, specific color, infrared, high intensity, etc.). In this way, server 24, when analyzing the captured images/captured video stream (captured optical data), can more easily detect the visual beacon.

Figure 15:
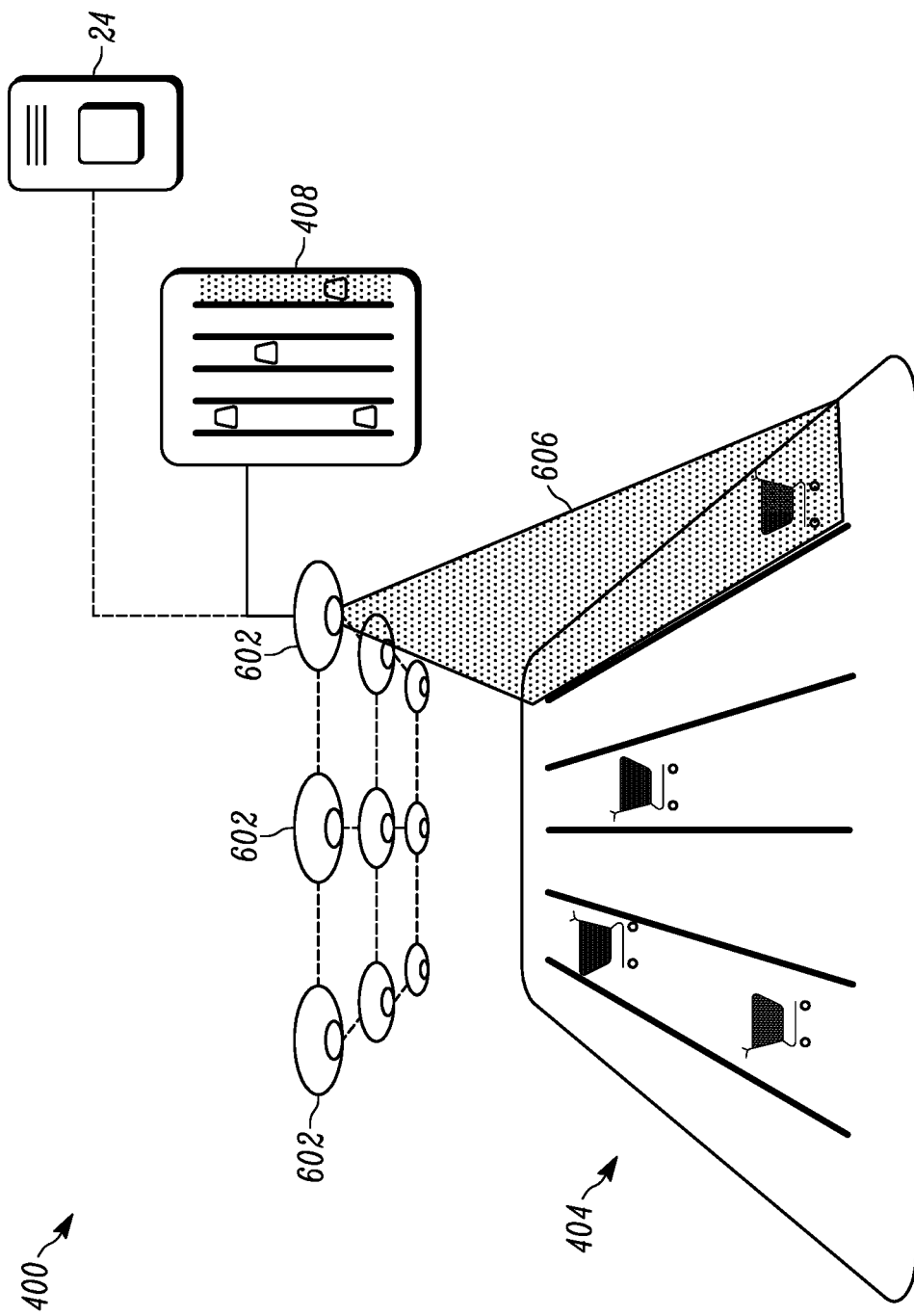

In some configuration, any combination of the RFID reader 402, ultrasonic transmitter 502, and video camera 504 may be packaged into a single enclosure 602, where, as shown in FIG. 15, a networked plurality of such enclosures 602 may be installed within the venue 404. In this configuration, each of the devices installed within the enclosure will emit signals and/or capture data over a predefined respective range 606. In considering the video camera 504, the predefined range 606 is a field of view of said camera. In considering the RFID reader 404, the predefined range 606 is a read zone of the RFID reader's antenna. And in considering the ultrasonic transmitter 504, the predefined range 606 range is the range at which ultrasonic signals can be detected as a sufficiently strong level. All respective predefined ranges can be static or dynamic. For instance, if a field of view of a camera 504 can be adjusted from a first field of view to a second field of view, the predefined range 606 includes both the first and second fields of view and all fields of view in between.

In some configurations, system 10 can provide consumers with reminders (e.g., pushed to the phone 16) if it detects that a product has not been scanned. In some cases, this may be achieved by employing system 400 and RFID readers 402, whereby when an RFID tag (unexpected tag) is detected within the cart 28 and that RFID tag is associated with a product that has not been scanned, the system 10 can issue a reminder.

The detection of an unexpected tag may also trigger an alert to be sent to the security personnel so that preparations may be made for a possible shrink event. Similarly, a detection of an unexpected tag may trigger any one of the video cameras 504 to capture a person associated with the cart that includes the unexpected tag. This can include the video camera 504 adjusting (e.g., moving and/or zooming in/out) its field of view to capture the desired consumer target and having another camera 504 capture images/video of the desired target if that target leaves the first camera's field of view.

In some configurations, system 10 can provide directions to a desired item within the store. Since, as described above, the consumer may be tracked by way of tracking the consumer's phone and/or by tracking the scanner associated with the consumer, knowing that information along with a proper location of a given item, the system 10 can provide directions to the consumer in any number of way, including, for example, providing on the phone 16 directions together with a map of the store.

In some configurations, the system 10 may be operable to accept a consumer's comment via voice recognition. In particular, the consumer may wish to, for example, request to know the location of an item of interest within the store. This can be done by activating a listening feature on the phone's app 14 and speaking a question into the phone's microphone. In response, the app may display a map of the store indicating, for example, the point where the consumer is located and the point where the item of interest is located. The system 10 can further provide directions to direct the consumer to the item of interest.

In some configurations, the system 10 may accept orders for certain departments prior to the consumer's arrival at the store. For example, a consumer may encounter a wait in departments like the deli, butcher, and bakery. To expedite the process, the consumer can be allowed to enter a desired order into the app prior to arriving at the store. When the consumer finally arrives and goes through the scanner collection process, system 10 recognizes the consumer's presence in the store and forwards a request to the appropriate department for the order to be filled. Preferably, the order is filled prior to the consumer's arrival at the respective department.

In some configurations, the consumer can bring his own reusable shopping bags and place items directly in them after scanning. Alternatively, each cart can include a dispenser of disposable bags, or bag dispensers can be located around the store. Since each item can be bagged immediately after scanning, there is no need for the time delay associated with bagging the items before leaving the store, such as stationary self-check-out systems may require.

In addition to using the scanner 12 for scanning items for purchase, the scanner 12 can also be used to do a price check. In an exemplary embodiment, the scanner 12 has a 'price check' button which, upon pressing, instructs the scanner 12 to display a price of the next item scanned without adding that item to the list of items the consumer is purchasing. In implementations where the system 10 supports voice recognition, the scanner can also be instructed to do a price check by a speech instruction.

In some configurations, the system 10 can be configured to allow a consumer to page a store representative for assistance. For instance, a button may be provided on the screen of the phone 16 that will summon a store representative when pressed. Furthermore, since, as described above, the location of the consumer may be known, the request for assistance may be routed to the appropriate store representative who is responsible for the specific area that the consumer is located in.

In some configurations, system 10 can be connected to a store's inventory database. This configuration can allow the app 14 to notify a consumer if an item on the shopping list 44 is out of stock at a particular location. This notification may be provided as soon as the item is entered into the shopping list. Such a configuration can help the consumer avoid an unnecessary trip to the store. The system 10 can also be configured to suggest alternate store locations which stock the desired product in the event that a desired product is out of stock at the consumer's default store.

The system 10 may also be configured to provide just-in-time fulfillment of items that have been placed into the consumer's shopping list but that are out of stock at a store. For example, the app may include a date field for when the consumer is planning a trip to the store. If, for example, the planned trip is 3 days away and the desired item is out of stock, the system 10 may initiate a fulfillment order to obtain the desired product before the consumer's trip to the store. Additionally, the consumer may be notified that while the desired product(s) is out of stock, it will be in stock by the planned trip. Alternatively, the consumer may be notified of an earliest date that the item can be delivered to the store.

In some configurations, the app 14 may also include game(s) for children and/or an emergency button that can be triggered in the event of a health or safety issue. The app may also be configured to track consumer's spending in a store over a particular period of time. For instance, the app may provide the consumer with a running total from a beginning of a month. Similarly, the app may provide a consumer with an amount left within a predefined, for example, monthly budget. The app may also provide notifications to the consumer in the event that he or she is approaching a budget limit set earlier or if, based on the consumer's spending habits, the budget is likely to be exceeded before it is due to expire.

The system 10 can also be designed to provide a notification to the consumer in the event that there is an emergency in the store. For example, in the event of a file, the consumer can be notified of the event and the system can direct the consumer to the nearest exit via the app 14.

The system 10 may also be configured to display (on the store map that may be displayed on the consumer's phone 16 screen) where the consumer is in the store at all times, and can give a visual or audible indication each time an item is scanned. It can also show on the map displayed on the phone where each item was scanned. This lets the consumer know that the system is aware of the consumer's location all the time and that it is keeping track of products scanned. This may discourage attempts to place in the cart items that haven't been scanned, or otherwise try to cheat the system. The video view of the consumer from the video camera(s) 504 may also be shown to the consumer as he walks around the store.

In some instances, the scanner 12 may be configured to run in batch mode, storing scanned items in the event the consumer's phone battery dies, allowing him to finish shopping. The stored scans can be dumped from the scanner when it is returned to the charger/dispenser 22. Since the system has already registered who that scanner is associated with, the consumer can be properly charged for items scanned when he leaves the store.

In some implementations, the system 10 can be implemented without a constant use of a connected phone 16. For instance, the consumer may provide a loyalty card with a barcode or display a consumer ID barcode on the phone screen. This can associate the selected scanner 12 with a specific consumer, charging the consumer when he leaves the store or replaces the scanner into the dispenser. In this case, the scanner 12 can operate in batch mode, transferring its contents to the dispenser (and the server 24) when the consumer places it back before leaving the store. In the event that the scanner does not have a "subtract" button to allow consumers to remove a previously added item from a list of items being purchased, there may be barcodes placed around the store that, upon being scanned, place the scanner 12 into a so-called "de-scan" mode. Scanning an item by the scanner when the scanner is in a de-scan mode causes that item to be removed from the consumer's item-purchase list. A shelf for de-scanned items can be placed near the de-scan barcodes to provide a convenient place to place items that are no longer wanted. The barcodes to de-scan an item can also be provided on the consumer's loyalty card and/or cell phone. It is further possible to configure the system to limit the number of items that can be purchased in this mode (e.g., maximum of 12 items).

In some configurations, system 10 includes a plurality of RFID readers installed in the vicinity of the aisles (e.g., near an entrance/end of an aisle). These RFID readers can be configured to scan the scanner 12 and items (by way of interrogating RFID tags attached to thereto) in the cart when the cart passes within range of one of the readers, and provide this information to the store server. This information can further be used to determine if the cart include an unexpected RFID tags, signaling the potential presence of an un-scanned item. Additionally, by associating each of the RFID readers with a predefined location, the RFID readers can be used to provide approximate locations of consumers when they pass thereby.

Figure 16:
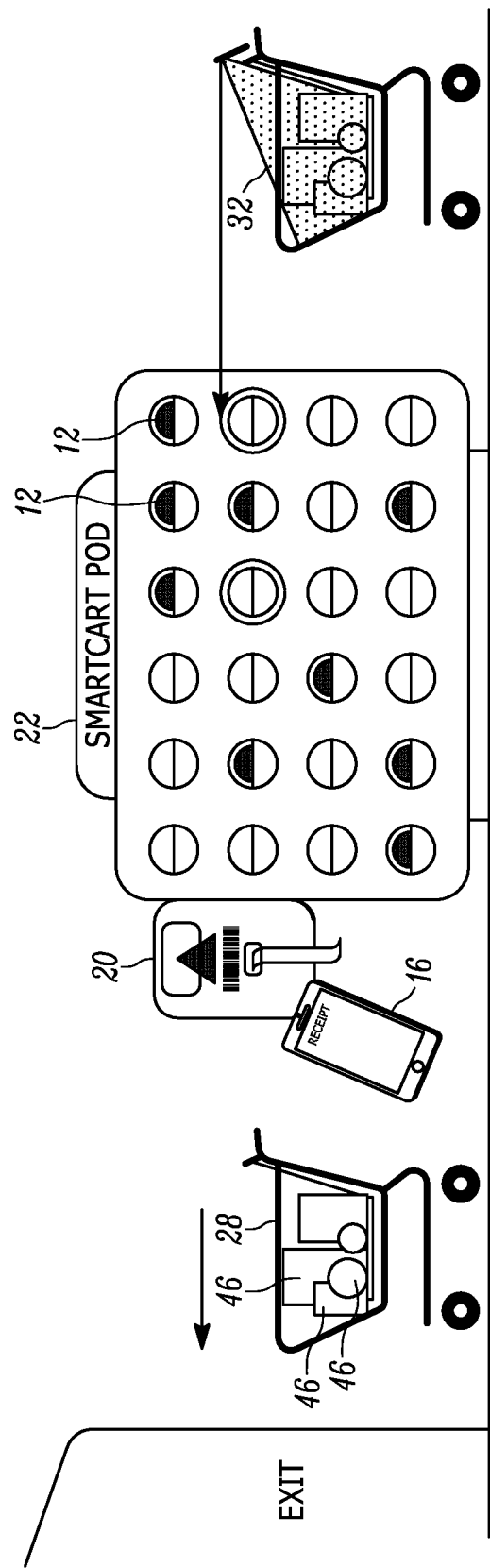
FIG. 16 is a block diagram of an exemplary shopping-completion process in accordance with an embodiment of the present disclosure.

Upon completion of the shopping trip, as shown in FIG. 16, the consumer replaces the scanner 12 back into the dispensing pod 22. A replacement of the scanner 12 into the pod 22 is detected by the server 24, causing the consumer to be charged the appropriate amount for the purchased items via the consumer's payment method. The consumer may be prompted whether or not he wants his receipt printed, emailed, or neither. Additionally, the app may provide a history of the consumer's prior purchases, reducing the need for receipts. After the scanner 12 has been replaced, the consumer can proceed to leave the store.

It should be appreciated that the app (14) can be implemented on any number of personal devices (e.g., mobile phone, smart watch, wearable device, etc.) and may provide a variety of functional aspects, some of which may be customizable by the consumer, some of which may be customizable by the retailer, and some of which may be customizable by the system provider providing the systems disclosed herein. Additionally, the app is preferably linked to a retailer in some way such that a particular version of the app is associated with a particular retailer in the mind of the consumer. In some instances, the app allows consumers to prepare a shopping list by allowing the consumer to enter items freehand or by selecting items from pre-populated lists which may be reflective of a store's inventory. In some cases, the app can provide pricing information for the items. This can include exact prices that can be based on the prices of a previously selected retail location, and price estimates or ranges that can be based on prices across multiple retail locations or prices across different retailers.

Upon entry of the consumer into the store and the pairing of the personal device with the store's network, as described earlier in this disclosure, the app may be configured to open automatically notifying the consumer that a successful connection has been established that he can proceed with the shopping process. For the shopper's convenience, the app may arrange the list of previously entered/selected items pursuant to some criteria. For example, the list may be arranged according to pre-designated locations in the store. If several items on a customer's list are located in, for example, Aisle 13, those items would be shown in a grouped section. It will be appreciated that this example is not meant to be limited, and the logical grouping of items within the app may be based on any number of factors, including overall positioning of items within predetermined sections of a store which extend beyond a single aisle, sub-sections of a single aisle, an endcap of an aisle, or sections which do not include aisles (i.e., any section defined by some boundary). The order of the list can also be arranged to make the most efficient path through the store based upon the items to be purchased (e.g., Aisle 5, Aisle 6, Meat Section, Aisle 7, Bakery, etc.). In other instances, the order of the list can be arranged to provide a path that will likely cause a consumer to purchase additional items not on the original list. For example, the app and/or the server to which the app is connected to may determine that there is a high likelihood that a consumer is purchasing items associated with an outdoor event. In this case, the list of previously entered items may be arranged such that a consecutive picking of the items from a list, combined with a likely traversal path between those items within the store will lead the consumer through a section selling items geared towards outdoor events. In some implementations, the app automatically arranges the items into their respective groupings on the list so that the consumer can have a better idea of where each item is in the store and could refer back to the list to ensure that they picked every item on their list in a given area.

To assist the customer with their shopping experience, the app may be configured to provide a floor plan of the store showing where each item may be found (with a route or marker for each product on the list. The route may be populated with just one item at a time (e.g., next item to be picked), as many as the customer may prefer by way of customization, or as many are preprogrammed into the app.

As the customer proceeds through the store, picking and scanning various items with the scanner 12, those items can be marked or otherwise stricken from the app's shopping list.

In some embodiments, prior to starting shopping, the app can be configured to request input from the customer to help determine a preferred route through the store. For instance, the app may be configured to ask the customer what side of the store they wish to begin shopping on. A response to such an inquiry can be used to further update any previously determined traversal path and/or the order/grouping of items in the shopping list. The app may also be configured to provide a suggestion on which area of the store the shopper can begin. This can be based on factors like, real-time congestion data, where the app suggests a starting point that is less congested. Additionally, the consumer's location may be used by the app to reorder the shipping list to better conform to the ordering approaches outlined herein. For instance, the list may be reordered such that the then-closest item on the list is first in the shopping list.

In some embodiments, the app may be configured to recognize returning consumers, especially those who frequent the store on a periodic basis. In this case, if a consumer appears to have forgotten an item that is regularly purchased, the app may suggest that it be added to the shopping list. The app may also be configured to remind the shopper that an item on the shopping list was skipped as they are traversing the store. In some instances, this can be done by recognizing that the customer has scanned an item in the next grouping of items on the list, but hasn't scanned all the items in the previous grouping.

In some embodiments, the app can be configured to display stock information related to any products on the shopping list. Similarly, the app can be configured to provide nutritional data (e.g., lactose content, gluten content, sugar level, caloric level, and ingredient list) associated with any of the items on the shopping list. While the app may provide this data to the consumer, to reduce effort necessary to keep track of such data, the app may be configured to allow the consumer to set flags to alert them when items they've added to the shopping list or scanned into the list violate any preset rules that they've created. In this way, a diabetic person can avoid products with high sugar content, a person with a gluten sensitivity can be alerted to the presence of said substance, and so on.

Other information might be displayed on items in the app's list, either at home while building the list or while shopping. Information such as (but not limited to) in-stock/out-of-stock, lactose content, gluten content, sugar level, caloric level, and presence of many other ingredients can be displayed. In order to minimize efforts from the customer in reviewing this data, they could also set flags in the app to alert them when items they've added to the list or scanned into the list violate any preset rules that they've created. In this way, a diabetic person can avoid products with high sugar content, a person with a gluten sensitivity can be alerted to the presence of said substance, a person with nut allergies can warned to avoid nut-containing foods, and so on.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

EXAMPLE EMBODIMENTS

Embodiment 1

In a first embodiment, the present invention is a data capture system for use within a venue, including: a data capture device repository housing a plurality of data capture devices, each of the plurality of data capture devices configured to capture product data; a first data capture module configured to capture, via a mobile device associated with a customer, customer data associated with the customer; and a server having at least one hardware processor, the server being communicatively coupled to at least one of the data capture device repository and the first data capture module, the server being configured to, upon the first data capture module capturing the customer data associated with the customer, associate one of the plurality of data capture devices with at least one of the customer and the customer data associated with the customer, resulting in an associated data capture device.

In some instances of the first embodiment, the server is further configured to, upon the first data capture module capturing the customer data associated with the customer, unlock the associated data capture device from the data capture device repository.

In some instances of the first embodiment, the first data capture module is configured to capture customer data associated with the customer by reading a barcode presented on the mobile device by a mobile application (app) implementing a graphical user interface (GUI).

In some instances of the first embodiment, the first data capture module is configured to capture customer data associated with the customer by exchanging radio signals with the mobile device.

In some instances of the first embodiment, the associated data capture device is chosen from the plurality of data capture devices based at least in part on a battery charge level.

In some instances of the first embodiment, the battery charge level is of a battery within the mobile device.

In some instances of the first embodiment, the battery charge level is of a respective battery within each of the plurality of data capture devices.

In some instances of the first embodiment, a location of the associated data capture device within the data capture device repository is indicated via a visual beacon.

In some instances of the first embodiment, the system further includes: a plurality of wireless access points disposed within the venue, each of the plurality of wireless access points being communicatively coupled to the server, wherein the mobile device includes a wireless communication module and a mobile application (app) implementing a graphical user interface (GUI), the mobile app configured to execute instructions, via one or more processors of the mobile device, to: activate the wireless communication module; establish a wireless connection to at least one of the plurality of wireless access points, resulting in a wireless communication link; and establish a connection to the server via the wireless communication link.

In some instances of the first embodiment, the mobile app is configured to automatically execute the instructions upon being launched on the mobile device.

In some instances of the first embodiment, the mobile app is configured to automatically execute the instructions upon detecting an entry of the customer into the venue.

In some instances of the first embodiment, the mobile app is configured to automatically execute the instructions upon reading an encoded message provided by the venue.

In some instances of the first embodiment, the encoded message is provided in a form of a barcode.

In some instances of the first embodiment, the encoded message is provided in a form of a radio signal.

In some instances of the first embodiment, the mobile app is configured to automatically execute the instructions upon reading an encoded message provided by the venue.

In some instances of the first embodiment, the first data capture module is configured to capture customer data associated with the customer by reading a barcode presented on GUI, the barcode including credentials of the mobile device, and the server is further configured to establish the wireless communication link at least in part based on the credentials of the mobile device.

In some instances of the first embodiment, the server is further configured to instruct the associated data capture device to enter a wireless pairing mode for pairing with the mobile device associated with the customer.

In some instances of the first embodiment, the server is further configured to transmit, to the mobile device associated with the customer, pairing credentials of the associated data capture device.

In some instances of the first embodiment, the associated data capture device is configured to generate an alert upon a passage of a predetermined amount of time without a successful pairing with the mobile device associated with the customer.

In some instances of the first embodiment, the associated data capture device is at least one of a barcode reader and a radio frequency identification (RFID) reader.

In some instances of the first embodiment, the associated data capture device is removably attachable to a shopping cart having an item-receiving area.

In some instances of the first embodiment, the associated data capture device includes a data capture assembly having a field of view (FOV), and wherein the FOV extends over a majority of the item-receiving area when the associated data capture device is removably attached to the shopping cart.

In some instances of the first embodiment, the associated data capture device includes a holder for the mobile device.

In some instances of the first embodiment, the associated data capture device further includes a securing arrangement configured to secure the secure the mobile device within the holder.

In some instances of the first embodiment, the system further includes a mobile application (app) implementing a graphical user interface (GUI), the mobile app configured to execute instructions, via one or more processors of the mobile device, to: provide, via the GUI, a platform to compile a shopping list having a plurality of products; store the shopping list in a memory of the mobile device; and upon capturing, via the associated data capture device, respective product data associated with one of the plurality of products, providing an indication, via the GUI, of the capturing of the respective product data associated with the one of the plurality of products.

In some instances of the first embodiment, the mobile app is configured to execute the instructions to provide, via the GUI, the platform to compile the shopping list by transferring the shopping list to the mobile device from an external database.

In some instances of the first embodiment, the external database is comprised by a server memory of the server.

In some instances of the first embodiment, the mobile app is further configured to execute the instructions to provide a running total cost of all products for which the respective product data has been captured.

In some instances of the first embodiment, the mobile app is further configured to execute the instructions to provide, via the GUI, a directional guidance associated with a pre-determined path through the venue for picking each of the plurality of products.

In some instances of the first embodiment, the at least one of the directional guidance and the path is based on at least one of a manual customer input, a real-time mobile device location, and a real-time congestion within the venue.

In some instances of the first embodiment, the system further includes a mobile application (app) implementing a graphical user interface (GUI), the mobile app configured to execute instructions, via one or more processors of the mobile device, to compile a product register, the product register including a list of products whose respective product data has been captured via the associated data capture device, the product register being stored within a memory of the mobile device.

In some instances of the first embodiment, the mobile app is further configured to execute the instructions to remove a to-be-removed product from the list of products upon (i) receiving a trigger indicative of a product-subtraction operation and (ii) capturing, via the associated data capture device, the respective product data associated with the to-be-removed product.

In some instances of the first embodiment, the system further includes a network of sensing units disposed throughout the venue, the network of sensing units being communicatively coupled to the server and being configured to record a location of the to-be-removed product upon the capturing, via the associated data capture device, the respective product data associated with the to-be-removed product.

In some instances of the first embodiment, upon the capturing, via the associated data capture device, the respective product data associated with the to-be-removed product, the server generates an alert message to a venue representative, the alert message including the location of the to-be-removed product.

In some instances of the first embodiment, the trigger indicative of the product-subtraction operation includes reading, via the associated data capture device, a subtraction barcode.

In some instances of the first embodiment, the subtraction barcode is provided via the GUI on the mobile device.

In some instances of the first embodiment, the subtraction barcode is a unique barcode provided via the GUI on the mobile device in response to a selection of the to-be-removed product from within the list of products.

In some instances of the first embodiment, the associated data capture device is a handheld scanner having at least one of an optical data capture assembly and a radio frequency identification (RFID) data capture assembly.

In some instances of the first embodiment, the mobile device includes a mobile device data capture assembly, and wherein the mobile device is configured as an extension of the associated data capture device such that the mobile device is operable to capture the product data via the mobile device data capture assembly.

In some instances of the first embodiment, the server is further configured to, upon a detection of a repositioning of the associated data capture device into the data capture device repository, close a session for products whose respective product data has been captured via at least one of the associated data capture device and the mobile device.

In some instances of the first embodiment, the system further includes a network of sensing units disposed throughout the venue, the network of sensing units being communicatively coupled to the server and being configured to track products within the venue, the network of sensing units being further configured to track at least one of the mobile device and the associated data capture device, wherein the server is further configured to generate an alert upon a detection of the associated data capture device capturing, at a capture location, product data associated with a scanned product having a predefined stock-keeping location that is different from the capture location.

In some instances of the first embodiment, the associated data capture device includes a charge pack configured to be connected to and to provide power to the mobile device.

In some instances of the first embodiment, the system further includes a mobile application (app) implementing a graphical user interface (GUI), the mobile app configured to execute instructions, via one or more processors of the mobile device, to: compile an exclusion list, the exclusion list including at least one of an ingredient and an item; and generate an alert upon a detection of the associated data capture device capturing product data associated with one of the plurality of products, wherein the one of the plurality of products includes the at least one of the ingredient and the item in the exclusion list.

In some instances of the first embodiment, the system further includes a network of sensing units disposed throughout the venue, the network of sensing units being communicatively coupled to the server and being configured to track the mobile device within the venue, wherein the server is further configured to locate the associated data capture device based on a location of the mobile device.

In some instances of the first embodiment, the system further includes a network of sensing units disposed throughout the venue, the network of sensing units being communicatively coupled to the server and being configured to track the associated data capture device within the venue, wherein the server is further configured to locate the mobile device based on a location of the associated data capture device.

Embodiment 2

In a second embodiment, the present invention is a data capture system for use within a venue, including: a data capture device repository housing a plurality of data capture devices, each of the plurality of data capture devices configured to capture product data; a first data capture module configured to capture, via a mobile device associated with a customer, at least one of customer data associated with the customer and mobile device data associated with the mobile device; and a server having at least one hardware processor, the server being communicatively coupled to at least one of the data capture device repository and the first data capture module, the server being configured to, upon the first data capture module capturing the at least one of the customer data associated with the customer and the mobile device data associated with the mobile device, associate one of the plurality of data capture devices with at least one of the customer, the customer data associated with the customer, and the mobile device data associated with the mobile device, resulting in an associated data capture device.

Embodiment 3

In a third another embodiment, the present invention is a data capture system for use within a venue, including: a data capture device repository housing a plurality of data capture devices, each of the plurality of data capture devices configured to capture product data and having a respective data capture assembly; and a server having at least one hardware processor, the server being communicatively coupled to at least one of the data capture device repository and each of the plurality of data capture devices, the server being configured to, upon one of the plurality of data capture devices capturing, via the respective data capture assembly and from a mobile device associated with a customer, at least one of a customer data associated with the customer and a mobile device data associated with the mobile: associate the one of the plurality of data capture devices with at least one of the customer, the customer data associated with the customer, and the mobile device data associated with the mobile device; and transmit an unlock signal to actuate a locking mechanism to unlock the one of the plurality of data capture devices from the data capture device repository.

Embodiment 4

In a fourth embodiment, the present invention is a product scanning system including: a barcode reader repository having a plurality of docking stations, each of the plurality of docking stations including a respective power connector and a respective lock; a plurality of barcode readers, each of the plurality of barcode readers being docked at one of the plurality of docking stations within the barcode reader repository such that each of the plurality of barcode readers is connected to the respective power connector and is locked by the respective lock of the one of the plurality of docking stations within the barcode reader repository, each of the plurality of barcode readers receiving an electrical charge from the respective power connector; a data acquisition assembly having an optical barcode reader including an imaging sensor and a lens assembly, the data acquisition assembly being configured to capture images of a symbolic target associated with an operator profile, the data acquisition assembly being further configured to decode the symbolic target captured in at least one of the images to obtain decoded data and forward the decoded data for further processing; and a server having at least one processor and at least one memory, the server having a communication link with at least one of (i) the barcode reader repository, (ii) each of the plurality of barcode readers, and (iii) the data acquisition assembly, the server being configured to execute instructions, via the at least one processor of the server device, to: receive the decoded data from the data acquisition assembly via the communication link and store the decoded data in the at least one memory; responsive to receiving the decoded data from the data acquisition assembly via the communication link, select one of the plurality of barcode readers resulting in a selected barcode reader; transmit, via the communication link, an unlock signal to the respective lock of the respective one of the plurality of docking stations having the selected barcode reader docked therein to enable a removal of the selected barcode reader; and transmit, via the communication link, a beacon signal to at least one of the barcode reader repository and the selected barcode reader to activate at least one of a visual, an acoustic, and a mechanical beacon indicative of a physical location of the selected barcode reader.

In some instances of the fourth embodiment, at least some of the plurality of barcode readers include a radio frequency identification (RFID) reader configured to interrogate RFID tags.

In some instances of the fourth embodiment, the selected barcode reader is a handheld barcode reader.

In some instances of the fourth embodiment, the selected barcode reader is removably attachable to a shopping cart having an item-receiving area.

In some instances of the fourth embodiment, the selected barcode reader includes a holder for a mobile device, the holder including a securing arrangement configured to secure the mobile device within the holder.

Embodiment 5

In a fifth embodiment, the present invention is a product scanning system including: a reader repository having a plurality of docking stations, each of the plurality of docking stations including a respective power connector and a respective lock; a plurality of product identification readers, each of the plurality of product identification readers being docked at one of the plurality of docking stations within the reader repository such that each of the plurality of product identification readers is connected to the respective power connector and is locked by the respective lock of the one of the plurality of docking stations within the reader repository, each of the plurality of product identification readers receiving an electrical charge from the respective power connector; a data acquisition assembly having at least one of (i) an optical barcode reader including an imaging sensor and a lens assembly, the data acquisition assembly being configured to capture images of a symbolic target associated with an operator profile, the data acquisition assembly being further configured to decode the symbolic target captured in at least one of the images to obtain decoded data and forward the decoded data for further processing, and (ii) a radio frequency identification (RFID) reader configured to interrogate an RFID tag associated with the operator profile, the data acquisition assembly being further configured to obtain payload data from the RFID tag and forward the payload data for further processing; and a server having at least one processor and at least one memory, the server having a communication link with at least one of (i) the reader repository, (ii) each of the plurality of product identification readers, and (iii) the data acquisition assembly, the server being configured to execute instructions, via the at least one processor of the server device, to: receive, from the data acquisition assembly via the communication link, at least one of the decoded data and the payload data, and store the at least one of the decoded data and the payload data in the at least one memory; responsive to receiving the at least one of the decoded data and the payload data, select one of the plurality of product identification readers resulting in a selected product identification reader; transmit, via the communication link, an unlock signal to the respective lock of the respective one of the plurality of docking stations having the selected product identification reader docked therein to enable a removal of the selected product identification reader; and transmit, via the communication link, a beacon signal to at least one of the reader repository and the selected product identification reader to activate at least one of a visual, an acoustic, and a mechanical beacon indicative of a physical location of the selected product identification reader.

In some instances of the fifth embodiment, the server is further configured to execute instructions, via the at least one processor of the server device, to, responsive to receiving the at least one of the decoded data and the payload data, signal the selected product identification reader to enter a wireless pairing mode for pairing with a mobile device associated with the operator profile.

In some instances of the fifth embodiment, the server is further configured to transmit, to the mobile device associated with the operator profile, pairing credentials of the selected product identification reader.

In some instances of the fifth embodiment, the selected product identification reader is configured to generate an alert upon a passage of a predetermined amount of time without a successful pairing with the mobile device.

In some instances of the fifth embodiment, the selected product identification reader is selected from the plurality of product identification readers based on at least one of (i) a battery charge level of a respective battery within each of the plurality of product identification readers and (ii) a battery within a mobile device associated with the operator profile.

Embodiment 6

In a sixth embodiment, the present invention is a product scanning system including: a reader repository having a plurality of docking stations, each of the plurality of docking stations including a respective power connector and a respective lock; a plurality of product identification readers, each of the plurality of product identification readers being docked at one of the plurality of docking stations within the reader repository such that each of the plurality of product identification readers is connected to the respective power connector and is locked by the respective lock of the one of the plurality of docking stations within the reader repository, each of the plurality of product identification readers receiving an electrical charge from the respective power connector, each of the plurality of product identification readers including a data acquisition assembly having at least one of (i) an optical barcode reader including an imaging sensor and a lens assembly, the data acquisition assembly being configured to capture images of a symbolic target associated with an operator profile, the data acquisition assembly being further configured to decode the symbolic target captured in at least one of the images to obtain decoded data and forward the decoded data for further processing, and (ii) a radio frequency identification (RFID) reader configured to interrogate an RFID tag associated with the operator profile, the data acquisition assembly being further configured to obtain payload data from the RFID tag and forward the payload data for further processing; and a server having at least one processor and at least one memory, the server having a communication link with at least one of (i) the reader repository and (ii) each of the plurality of product identification readers, the server being configured to execute instructions, via the at least one processor of the server device, to: receive, from the data acquisition assembly via the communication link, at least one of the decoded data and the payload data, and store the at least one of the decoded data and the payload data in the at least one memory, the at least one of the decoded data and the payload data being captured by a selected product identification reader; responsive to receiving the at least one of the decoded data and the payload data, transmit, via the communication link, an unlock signal to the respective lock of the respective one of the plurality of docking stations having the selected product identification reader docked therein to enable a removal of the selected product identification reader; and transmit, via the communication link, a beacon signal to at least one of the reader repository and the selected product identification reader to activate at least one of a visual, an acoustic, and a mechanical beacon indicative of a physical location of the selected product identification reader.

In some instances of the sixth embodiment, the selected product identification reader is a handheld product identification reader.

In some instances of the sixth embodiment, the selected product identification reader is removably attachable to a shopping cart having an item-receiving area.

In some instances of the sixth embodiment, the selected product identification reader includes a holder for a mobile device, the holder including a securing arrangement configured to secure the mobile device within the holder.

In some instances of the sixth embodiment, the server is further configured to execute instructions, via the at least one processor of the server device, to, responsive to receiving the at least one of the decoded data and the payload data, signal the selected product identification reader to enter a wireless pairing mode for pairing with a mobile device associated with the operator profile.

In some instances of the sixth embodiment, the server is further configured to transmit, to the mobile device associated with the operator profile, pairing credentials of the selected product identification reader.

In some instances of the sixth embodiment, the selected product identification reader is configured to generate an alert upon a passage of a predetermined amount of time without a successful pairing with the mobile device.

In some instances of the sixth embodiment, the server is further configured to execute instructions, via the at least one processor of the server device, to transmit, via the communication link, a beacon signal to at least one of the reader repository and one of the plurality of product identification readers having a low charge to activate a beacon indicative of the one of the plurality of product identification readers having the low charge having a charge level that is at or below at least one of a predefined power level and a calculated power level, the calculated power level being based on respective power levels of at least some others of the plurality of product identification readers.

Embodiment 7

In a seventh embodiment, the present invention is a method for assigning a data capture device to a customer within a venue, comprising:

proving a data capture device repository housing a plurality of data capture devices, each of the plurality of data capture devices configured to capture product data;

capturing, from a mobile device associated with the customer, via a first data capture module, customer data associated with the customer; and responsive to the operation of capturing the customer data, associating, via a server having at least one hardware processor and being communicatively coupled to at least one of the data capture device repository and the first data capture module, one of the plurality of data capture devices with at least one of the customer and the customer data associated with the customer, resulting in an associated data capture device.

The invention claimed is:

1. A product scanning system comprising:
a reader repository having a plurality of docking stations, each of the plurality of docking stations including a respective power connector and a respective lock;
a plurality of product identification readers, each of the plurality of product identification readers being docked at one of the plurality of docking stations within the reader repository such that each of the plurality of product identification readers is connected to the respective power connector and is locked by the respective lock of the one of the plurality of docking stations within the reader repository, each of the plurality of product identification readers receiving an electrical charge from the respective power connector;
a data acquisition assembly having at least one of (i) an optical barcode reader including an imaging sensor and a lens assembly, the data acquisition assembly being configured to capture images of a symbolic target associated with an operator profile, the data acquisition assembly being further configured to decode the symbolic target captured in at least one of the images to obtain decoded data and forward the decoded data for further processing, and (ii) a radio frequency identification (RFID) reader configured to interrogate an RFID tag associated with the operator profile, the data acquisition assembly being further configured to obtain payload data from the RFID tag and forward the payload data for further processing; and
a server having at least one processor and at least one memory, the server having a communication link with at least one of (i) the reader repository, (ii) each of the plurality of product identification readers, and (iii) the data acquisition assembly, the server being configured to execute instructions, via the at least one processor of the server device, to:
receive, from the data acquisition assembly via the communication link, at least one of the decoded data and the payload data, and store the at least one of the decoded data and the payload data in the at least one memory;
responsive to receiving the at least one of the decoded data and the payload data, select one of the plurality of product identification readers resulting in a selected product identification reader, the selected product identification reader being selected from the plurality of product identification readers based on a battery charge level within a mobile device associated with the operator profile and further based on a battery charge level of a respective battery within each of the plurality of product identification readers;
transmit, via the communication link, an unlock signal to the respective lock of the respective one of the plurality of docking stations having the selected product identification reader docked therein to enable a removal of the selected product identification reader; and
transmit, via the communication link, a beacon signal to at least one of the reader repository and the selected product identification reader to activate at least one of a visual, an acoustic, and a mechanical beacon indicative of a physical location of the selected product identification reader.

2. The product scanning system of claim 1, wherein the server is further configured to execute instructions, via the at least one processor of the server device, to, responsive to receiving the at least one of the decoded data and the payload data, signal the selected product identification reader to enter a wireless pairing mode for pairing with a mobile device associated with the operator profile.

3. The product scanning system of claim 2, wherein the server is further configured to transmit, to the mobile device associated with the operator profile, pairing credentials of the selected product identification reader.

4. The product scanning system of claim 2, wherein the selected product identification reader is configured to generate an alert upon a passage of a predetermined amount of time without a successful pairing with the mobile device.

* * * * *